United States Patent
Li et al.

(10) Patent No.: US 10,440,344 B2
(45) Date of Patent: Oct. 8, 2019

(54) METHOD AND APPARATUS FOR CORRECTING IMAGE ERROR IN NAKED-EYE THREE-DIMENSIONAL (3D) DISPLAY

(71) Applicant: Samsung Electronics Co., Ltd., Suwon-si, Gyeonggi-do (KR)

(72) Inventors: Weiming Li, Beijing (CN); Mingcai Zhou, Beijing (CN); Tao Hong, Beijing (CN); Dong Kyung Nam, Yongin-si (KR); Hyoseok Hwang, Suwon-si (KR); Jinho Lee, Suwon-si (KR); Zairan Wang, Beijing (CN); Zhihua Liu, Beijing (CN); Haitao Wang, Beijing (CN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 130 days.

(21) Appl. No.: 15/416,240

(22) Filed: Jan. 26, 2017

(65) Prior Publication Data
US 2017/0214900 A1    Jul. 27, 2017

(30) Foreign Application Priority Data

Jan. 27, 2016   (CN) .......................... 2016 1 0055821
Aug. 29, 2016  (KR) ........................ 10-2016-0110120

(51) Int. Cl.
*H04N 13/00*     (2018.01)
*H04N 13/327*    (2018.01)
(Continued)

(52) U.S. Cl.
CPC ........... *H04N 13/122* (2018.05); *G09G 3/003* (2013.01); *G09G 3/2092* (2013.01); *H04N 13/31* (2018.05);
(Continued)

(58) Field of Classification Search
CPC .... H04N 13/122; H04N 13/31; H04N 13/327; G09G 3/003; G09G 3/2092; G09G 2320/0693; G09G 3/006
See application file for complete search history.

(56) References Cited

U.S. PATENT DOCUMENTS 6,366,281 B1 *   4/2002  Lipton .................... G06T 13/80
                                                             345/419
2007/0109320 A1 * 5/2007  Skibak .................. G06T 11/001
                                                             345/611
(Continued)

FOREIGN PATENT DOCUMENTS

JP    2007-065441 A    3/2007
JP    2013-190713 A    9/2013
(Continued)

*Primary Examiner* — Susan E. Hodges
(74) *Attorney, Agent, or Firm* — Harness, Dickey & Pierce, P.L.C.

(57) ABSTRACT

A method and apparatus for correcting an image error in a naked-eye three-dimensional (3D) display may include controlling a flat-panel display displaying a stripe image, calculating a raster parameter of the naked-eye 3D display based on a captured stripe image, and correcting a stereoscopic image displayed on the naked-eye 3D display based on the calculated raster parameter, wherein the naked-eye 3D display includes the flat-panel display and the raster.

20 Claims, 19 Drawing Sheets

(51) Int. Cl.
*G02B 27/22* (2018.01)
*H04N 13/122* (2018.01)
*G09G 3/20* (2006.01)
*H04N 13/31* (2018.01)
*G09G 3/00* (2006.01)

(52) U.S. Cl.
CPC ........... *H04N 13/327* (2018.05); *G09G 3/006* (2013.01); *G09G 2320/0693* (2013.01)

(56) References Cited

U.S. PATENT DOCUMENTS

2010/0220325 A1* 9/2010 Otte .................. G02B 27/2214
356/400
2013/0182083 A1* 7/2013 Grossmann .......... H04N 13/327
348/51
2013/0258057 A1* 10/2013 Mishima ............ G02B 27/2214
348/46

FOREIGN PATENT DOCUMENTS

| | | |
|---|---|---|
| JP | 5354252 B2 | 11/2013 |
| KR | 10-1340798 B1 | 12/2013 |
| KR | 10-2014-0071638 A | 6/2014 |

\* cited by examiner

FIG. 11

| $R_{11}$ | $R_{12}$ | ....... | | | ----- | $R_{1Nc}$ |
|---|---|---|---|---|---|---|
| $R_{21}$ | $R_{22}$ | ....... | | | ----- | $R_{2Nc}$ |
| | | | | | | |
| | | | | | | |
| $R_{Nr1}$ | $R_{Nr2}$ | ....... | | | ----- | $R_{NrNc}$ |

METHOD AND APPARATUS FOR CORRECTING IMAGE ERROR IN NAKED-EYE THREE-DIMENSIONAL (3D) DISPLAY

CROSS-REFERENCE TO RELATED APPLICATION

This application claims under 35 U.S.C. § 119 to Chinese Patent Application No. 201610055821.4 filed on Jan. 27, 2016, in the State Intellectual Property Office of the People's Republic of China and Korean Patent Application No. 10-2016-0110120 filed on Aug. 29, 2016 in the Korean Intellectual Property Office, the entire contents of which are incorporated herein by reference in their entirety.

BACKGROUND

1. Field

At least one example embodiment relates to three-dimensional (3D) display technology and, more particularly, to a method and apparatus for correcting an image error in a naked-eye 3D display.

2. Description of the Related Art

A naked-eye three-dimensional (3D) display is technology having been developed in a 3D display technology. The naked-eye 3D display allows a user to view a 3D image without wearing 3D glasses.

The naked-eye 3D display includes a flat-panel display and a raster on the flat-panel display.

Due to restrictions on accuracy on manufacturing and installation, the raster may have an error. For example, an actual parameter such as a structure and a shape of the raster may differ from a designed value. Among such parameters, a gap may be present between the raster and a screen of the flat-panel display as the error of the raster.

The error of the rater may cause an occurrence of an error in a stereoscopic image displayed on the naked-eye 3D display, which may affect a viewing quality.

SUMMARY

In an aspect, there is provided a method of correcting an image error in a naked-eye 3D display, the method including controlling a flat-panel display to display a stripe image, calculating a raster parameter of the naked-eye 3D display based on a captured stripe image, and correcting a stereoscope image displayed on the flat-panel display based on the calculated raster parameter. The naked-eye 3D display includes the flat-panel display and a raster disposed on the flat-panel display.

A method and apparatus for correcting an image error in a naked-eye three-dimensional (3D) display is provided.

Some example embodiments relate to a method of correcting an image error in a naked-eye 3D display.

In some example embodiments, the method may include controlling a flat-panel display displaying a stripe image, calculating a raster parameter of the naked-eye 3D display based on a captured stripe image, the captured stripe image being displayed after the stripe image displayed on the flat-panel display passes through a raster provided on a surface of the flat-panel display, and correcting a stereoscopic image displayed on the naked-eye 3D display based on the calculated raster parameter, wherein the naked-eye 3D display includes the flat-panel display and the raster.

An image of each row in the stripe image displayed on the flat-panel display may have a periodic signal of an equal wavelength, and the periodic signal may have a change in brightness in a wavelength of each period.

$S1(x, y)$ corresponding to the stripe image may satisfy the following equations:

$S1(x,y)=A1*0.5[\sin(W_c*(x-P1))+1]$ where x denotes a horizontal coordinate of a pixel of the stripe image on a screen of the flat-panel display, y denotes a vertical coordinate of the pixel, A1 denotes an amplitude of the stripe image, and P1 denotes an error in the stripe image; $W_c=2\pi/T_c$, $T_c=(T_o*T_b)/(T_o+T_b)$ where $T_b$ denotes a sampling period of the raster on the screen of the flat-panel display; $T_{min}<T_o<M*T_{min}$ where M is a predetermined or, alternatively, desired constant; and $T_{min}=2*D_v*\tan(A_m/2)*P_m/R_m$ where $D_v$ denotes a viewing distance of the naked-eye 3D display, $A_m$ denotes a horizontal angle of a capturing device used for capturing, $P_m$ denotes a number of pixels in a gap between stripes to be extracted during an image processing, and $R_m$ denotes a horizontal pixel resolution of the capturing device.

The calculating of the raster parameter based on the captured stripe image may further include rectifying an image including the captured stripe image and calculating the raster parameter based on the captured stripe image.

The rectified image and an unrectified image may satisfy the following equation: $u*[x_s,y_s,1]^T=H*[x_i,y_i,1]^T$ where u denotes a standardization factor, $P_i=[x_i,y_i]$ is coordinates of a predetermined or, alternatively, desired pixel of the unrectified image, $P_s=[x_s,y_s]$ is coordinates of a pixel of the rectified image corresponding to the predetermined or, alternatively, desired pixel of the unrectified image, and H denotes a homographic transformation matrix.

When the raster parameter corresponds to a gap between the raster and the screen of the flat-panel display, the raster parameter may be calculated based on a stripe image included in the rectified image, the calculating of the raster parameter may include acquiring at least two image rows by performing sampling in the stripe image of the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a gap between the screen of the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and acquiring a gap $G(x, y)$ between the raster and the flat-panel display by performing fitting based on a three-element set $\{[x_c, y_r, G_r(x; y_r)]\}$, wherein $[x_c, y_r]$ denotes coordinates of a pixel on the screen of the flat-panel display and $G_r(x; y_r)$ denotes a gap between the screen of the flat-panel display and the raster corresponding to the pixel.

When the raster parameter corresponds to a gap between the raster and the screen of the flat-panel display, the calculating of the raster parameter based on the captured stripe image may include dividing the screen of the flat-panel display into at least two neighboring gratings $\{R_{ij}\}$ having the same size, wherein, in $R_{ij}$, i is a value of 1 through $N_r$, and j is a value of 1 through $N_c$, $N_r$ denotes a number of rows of a grating acquired through a division, and $N_c$ denotes a number of columns of the grating, calculating a gap $G_{ij}$ between the screen of the flat-panel display and a raster of the grating using a predetermined or, alternatively, desired method with respect to the respective grating $R_{ij}$, $G_{ij}$ being a constant, and calculating a gap $G(x, y)$ between the flat-panel display and the raster of the naked-eye 3D display, wherein if $[x, y] \in R_{ij}$, $G(x, y)$ satisfies the following equation: $G(x, y)=G_{ij}$, and the predetermined or, alternatively, desired method includes acquiring at least two image rows by sampling a stripe image corresponding to the gratings and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a distance between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device performs sampling by penetrating the raster relative to the screen of the flat-panel display and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N}G_r(x; y_r)/N$ and acquiring $G_{ij}$ by calculating an x-directional average value using $G(x)$.

When the raster parameter corresponds to a gap between the raster and the screen of the flat-panel display, the calculating of the raster parameter based on the captured stripe image may include generating a grating corresponding to a grating center point gradually and iteratively such that all regions on the screen of the flat-panel display cover the grating at least once, wherein the center point is generated based on a predetermined or, alternatively, desired random distribution and a size of the grating is determined in advance, and calculating $G_i$ corresponding to a gap between the screen of the flat-panel display and a raster of the grating using a predetermined or, alternatively, desired method with respect to the respective grating $R_{ij}$, wherein $G_{ij}$ is a constant, i is a value of 1 through $N_s$, $N_s$ denotes a total number of gratings, and $G(x, y)$ corresponding to a gap between the calculated raster and the flat-panel display satisfies the following equation: $G(x, y)=(1/N_a)*\Sigma_{i=1}^{N_s}[a(x,y,i)*G_i]$ where if $[x, y]\in R_i$, $a(x,y,i)$ is 1, and if not $[x, y]\in R_i$, $a(x,y,i)$ is zero and $N_a=\Sigma_{i=1}^{N_s}a(x,y,i)$, and the predetermined or, alternatively, desired method may include acquiring at least two image rows by performing sampling in a stripe image corresponding to the grating and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a gap between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N}G_r(x; y_r)/N$ and acquiring $G_{ij}$ by calculating an x-directional average value using $G(x)$.

When the raster parameter corresponds to a gap between the raster and the screen of the flat-panel display, the calculating of the raster parameter based on the captured stripe image may include acquiring at least two sampling points by performing sampling on the screen of the flat-panel display and generating a grating in a predetermined or, alternatively, desired size based on each of the sampling points as a center point, calculating $G_{pk}$ corresponding to a gap between the screen of the flat-panel display and a raster of the grating using a predetermined or, alternatively, desired method for each grating $R_{pk}$, wherein $G_{pk}$ is a constant, p is a value of 1 through $N_p$, k is a value of 1 through $N_k$, $N_p$ denotes a number of rows in the grating, and $N_k$ denotes a number of columns in the grating, and acquiring $G(x, y)$ corresponding to a gap between the raster and the flat-panel display through an interpolation of a three-element set $\{[x_{pk}, y_{pk}, G_{pk}]\}$, where $[x_{pk}, y_{pk}]$ denotes coordinates of a center point of the grating $R_{pk}$ on the screen of the flat-panel display, and $G_{pk}$ denotes a gap between a raster in the grating $R_{pk}$ and the screen of the flat-panel display, and the predetermined or, alternatively, desired method may include acquiring at least two image rows by performing sampling in a stripe image corresponding to the grating and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a gap between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N}G_r(x; y_r)/N$ and acquiring $G_{pk}$ by calculating an x-directional average value using $G(x)$.

A method of acquiring the local period function of the signal corresponding to the $r^{th}$ image row may include calculating a number of pixels Num corresponding to a distance between neighboring peaks based on peaks, each acquired from the signal corresponding to the image row, wherein the distance between the neighboring peaks is Num*Ws/PixNum, Ws denotes a width of a raster area corresponding to a sampled stripe image, and PixNum denotes a number of pixels in the image row, and acquiring a local period function $T_r(x; y_r)$ of the signal corresponding to the image row by performing fitting on the distance between the neighboring peaks.

A method of correcting the stereoscopic image displayed on the flat-panel display based on the calculated raster parameter may include acquiring a light beam model of the naked-eye 3D display based on the calculated raster parameter, and controlling the naked-eye 3D display to generate a stereoscopic image using the light beam model.

Other example embodiments relate to an apparatus for correcting an image error in a naked-eye 3D display.

In some example embodiments, the apparatus may include a display controller configured to control a flat-panel display displaying a stripe image, a raster parameter calculator configured to calculate a raster parameter of the naked-eye 3D display based on a captured stripe image, the captured stripe image being displayed after the stripe image displayed on the flat-panel display passes through a raster provided on a surface of the flat-panel display, and a stereoscopic image corrector configured to correct a stereoscopic image displayed on the naked-eye 3D display based on the calculated raster parameter, wherein the naked-eye 3D display includes the flat-panel display and the raster.

An image of each row in the stripe image displayed on the flat-panel display may have a periodic signal of an equal wavelength, and the periodic signal may have a change in brightness in a wavelength of each period.

$S1(x, y)$ corresponding to the stripe image may satisfy the following equations: $S1(x,y)=A1*0.5[\sin(W_c*(x-P1))+1]$ where x denotes a horizontal coordinate of a pixel of the stripe image on a screen of the flat-panel display, y denotes a vertical coordinate of the pixel, A1 denotes an amplitude of the stripe image, and P1 denotes an error in the stripe image; $W_c=2\pi/T_c$, $T_c=(T_o*T_b)/(T_o+T_b)$ where $T_b$ denotes a sampling period of the raster on the screen of the flat-panel screen; $T_{min}<T_o<M*T_{min}$ where M is a predetermined or, alternatively, desired constant; and $T_{min}=2*D_v*\tan(A_m/2)*P_m/R_m$ where $D_v$ denotes a viewing distance of the naked-eye 3D distance, $A_m$ denotes a horizontal angle of a capturing device used for capturing, $P_m$ denotes a number of pixels in a gap between stripes to be extracted during an image processing, and $R_m$ denotes a horizontal pixel resolution of the capturing device.

The apparatus may further include an image rectifier configured to rectify an image including the captured stripe image before the raster parameter calculator calculates the raster parameter based on the captured stripe image, and the raster parameter calculator may be used by the image rectifier for a raster parameter of the naked-eye 3D display based on a stripe image of the rectified image.

The rectified image and an unrectified image may satisfy the following equation: $u*[x_s,y_s,1]^T=H*[x_i,y_i,1]^T$ where u denotes a standardization factor, $P_i=[x_i,y_i]$ is coordinates of a predetermined or, alternatively, desired pixel of the unrectified image, $P_s=[x_s,y_s]$ is coordinates of a pixel of the rectified image corresponding to the predetermined or, alternatively, desired pixel of the unrectified image, and H denotes a homographic transformation matrix.

When the raster parameter corresponds to a gap between the raster and the screen of the flat-panel display, the raster parameter calculator may include an image row sampler configured to acquire at least two image rows by performing sampling in the stripe image of the rectified image at preset or, alternatively, desired sampling intervals, a local period function acquirer configured to acquire a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, a gap calculator configured to calculate $G_r(x; y_r)$ corresponding to a gap between the screen of the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device perform sampling by penetrating the raster relative to the screen of the flat-panel display; and $Tsr(x; y_r)=T_c(y_r)*T_r(x; y_r)/(T_r(x; y_r)-T_c(y_r))$ where $T_r(y_r)$ denotes a period of the $r^{th}$ image row, and a fitting unit configured to perform fitting based on a three-element set $\{[x_c, y_r, G_r(x; y_r)]\}$ and acquire a gap $G(x, y)$ between the raster and the flat-panel display, wherein, in $\{[x_c, y_r, G_r(x; y_r)]\}$, $[x_c,y_r]$ denotes coordinates of a pixel on the screen of the flat-panel display and $G_r(x; y_r)$ denotes a gap between the screen of the flat-panel display and the raster corresponding to the pixel.

When the raster parameter corresponds to a gap between the raster and the screen of the flat-panel display, the raster parameter calculator may include a divider configured to divide the screen of the flat-panel display into at least two neighboring gratings $\{R_{ij}\}$ having the same size, wherein, in $R_{ij}$, i is a value of 1 through $N_r$, j is a value of 1 through $N_c$, $N_r$ denotes a number of rows of a grating acquired through a division, and $N_c$ denotes a number of columns of the grating, a grating gap calculator configured to calculate a gap $G_{ij}$ between the screen of the flat-panel display and a raster of the grating using a predetermined or, alternatively, desired method with respect to the respective grating $R_{ij}$, $G_{ij}$ being a constant, and an overall gap calculator configured to calculate a gap $G(x, y)$ between the flat-panel display and the raster of the naked-eye 3D display, $G(x, y)$ being equal to $G_{ij}$ if $[x, y] \in R_{ij}$, and the predetermined or, alternatively, desired method may include acquiring at least two image rows by sampling a stripe image corresponding to the gratings and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a distance between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N} G_r(x; y_r)/N$ and acquiring $G_{ij}$ by calculating an x-directional average value using $G(x)$.

When the raster parameter corresponds to a gap between the raster and the screen of the flat-panel display, the raster parameter calculator may include a grating generator configured to generate a grating corresponding to a grating center point gradually and iteratively such that all regions on the screen of the flat-panel display cover the grating at least once, wherein the center point is generated based on a predetermined or, alternatively, desired random distribution and a size of the grating is determined in advance, a grating gap calculator configured to calculate $G_t$ corresponding to a gap between the screen of the flat-panel display and a raster of the grating using a predetermined or, alternatively, desired method with respect to the respective grating $R_i$, wherein $G_i$ is a constant, i is a value of 1 through $N_s$, and $N_s$ denotes a total number of grating, and an overall gap calculator configured to calculate G(x, y) corresponding to a gap between the calculated raster and the flat-panel display satisfies the following equation: $G(x, y)=(1/N_a)*\Sigma_{i=1}^{N_s}[a(x, y,i)*G_i]$ where if $[x, y]\in R_i$, a(x,y,i) is 1, and if not $[x, y]\in R_i$, a(x,y,i) is zero and $N_a=\Sigma_{i=1}^{N_s} a(x,y,i)$, and the predetermined or, alternatively, desired method may include acquiring at least two image rows by performing sampling in a stripe image corresponding to the grating and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a gap between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device perform sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N}G_r(x; y_r)/N$ and acquiring $G_i$ by calculating an x-directional average value using G(x).

When the raster parameter corresponds to a gap between the raster and the screen of the flat-panel display, the raster parameter calculator may include a grating generator configured to acquire at least two sampling points by performing sampling on the screen of the flat-panel display and generate a grating in a predetermined or, alternatively, desired size based on each of the sampling points as a center point, a grating gap calculator configured to calculate $G_{pk}$ corresponding to a gap between the screen of the flat-panel display and a raster of the grating using a predetermined or, alternatively, desired method with respect to each grating $R_{pk}$, wherein $G_{pk}$ is a constant, p is a value of 1 through $N_p$, k is a value of 1 through $N_k$, $N_p$ denotes a number of rows in the grating, and $N_k$ denotes a number of columns in the grating, and an overall gap calculator configured to acquire G(x, y) corresponding to a gap between the raster and the flat-panel display through an interpolation of a three-element set $\{[x_{pk}, y_{pk}, G_{pk}]\}$, where $[x_{pk}, y_{pk}]$ denotes coordinates of a center point of the grating $R_{pk}$ on the screen of the flat-panel display, and $G_{pk}$ denotes a gap between a raster in the grating $R_{pk}$ and the screen of the flat-panel display, and the predetermined or, alternatively, desired method may include acquiring at least two image rows by performing sampling in a stripe image corresponding to the grating and the rectified image at preset or, alternatively, desired sampling intervals, acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, calculating $G_r(x; y_r)$ corresponding to a gap between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and calculating $G(x)=\Sigma_{r=1}^{N}G_r(x; y_r)/N$ and acquiring $G_{pk}$ by calculating an x-directional average value using G(x).

The apparatus for correcting an image error in the naked-eye 3D display is configured to calculate a number of pixels Num corresponding to a distance between neighboring peaks based on peaks, each acquired from the signal corresponding to the image row, wherein the distance between the neighboring peaks is Num*Ws/PixNum, Ws denotes a width of a raster area corresponding to a sampled stripe image, and PixNum denotes a number of pixels in the image row, and acquire a local period function $T_r(x; y_r)$ of the signal corresponding to the image row by performing fitting on the distance between the neighboring peaks.

The stereoscopic image correcting module may include a light beam model acquirer configured to acquire a light beam model of the naked-eye 3D display based on the calculated raster parameter, and a stereoscopic image generation controller configured to control the naked-eye 3D display to generate a stereoscopic image using the light beam model.

The aforementioned contents may be applicable to a naked 3D display including a flat-panel display and a raster. It is possible to correct a stereoscopic image display on the naked-eye 3D display by controlling a stripe image displayed on the flat-panel display, capturing a stripe image after the stripe image displayed on the flat-panel display penetrates the raster, calculating a raster parameter of the naked-eye 3D display based on the captured stripe image, and adjusting a method of an image generated by the flat-panel display based on the calculated raster parameter. Through this, a quality of the stereoscopic image displayed on the naked-eye 3D display and a satisfaction of a user viewing the stereoscopic image may be enhanced.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 11 illustrates an example of dividing a screen of a flat-panel display into gratings according to at least one example embodiment;

DETAILED DESCRIPTION

Figure 1:
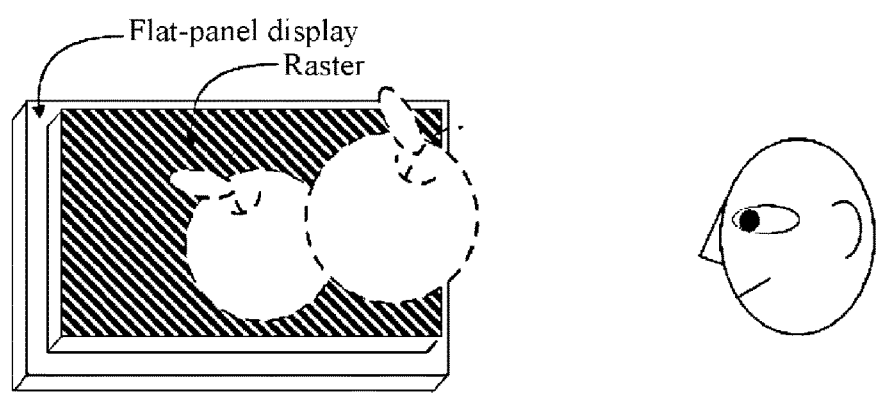
FIG. 1 illustrates an example of a naked-eye three-dimensional (3D) display according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, to solve an issue that an error in a three-dimensional (3D) image displayed on a naked-eye 3D display affects a view quality, descriptions of a method of correcting an image error of a naked-eye 3D display and an apparatus for correcting an image error of a naked-eye 3D display using the method will be provided with reference to the following examples.

Referring to FIG. 1, a raster may disperse light to represent different sub-pixel sets of a flat-panel display at different angles and positions in a region of view. Based on a type of display technology, the raster may be implemented as, for example, a slot raster, a liquid crystal display (LCD), and a lens array.

Figure 2A:
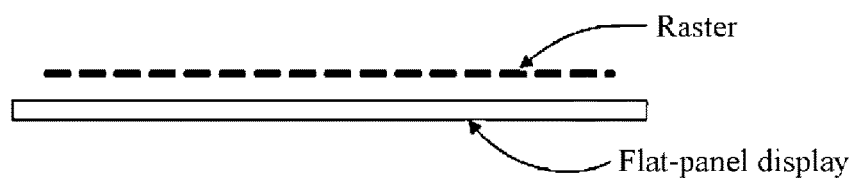
FIGS. 2A through 2C illustrate examples of a naked 3D display having an error in a gap between a raster and a flat-panel display in comparison to the gap being an ideal value according to at least one example embodiment.
Figure 2B:
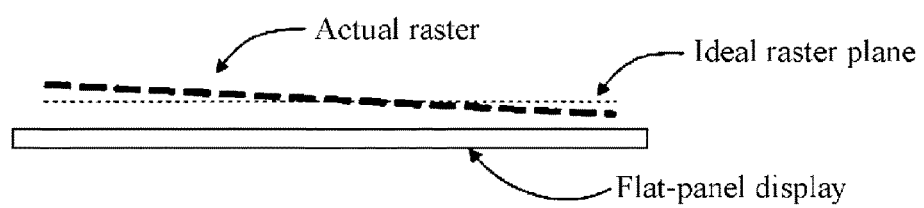
Figure 2C:
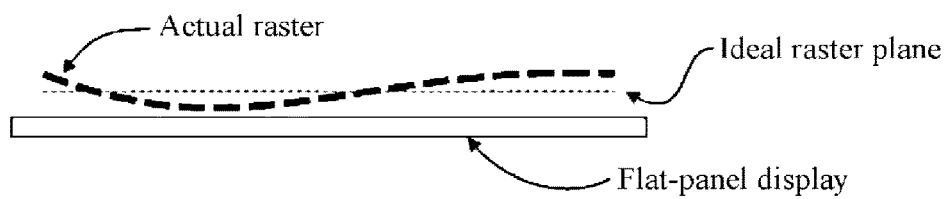

FIG. 2A illustrates an example of an ideal arrangement of a raster and a flat-panel display. FIGS. 2B and 2C illustrate examples of a raster error that may occur in practice. A raster inclination error occurs in an example of FIG. 2B, and a non-linear raster transformation error occurs in an example of FIG. 2C.

Figure 3:
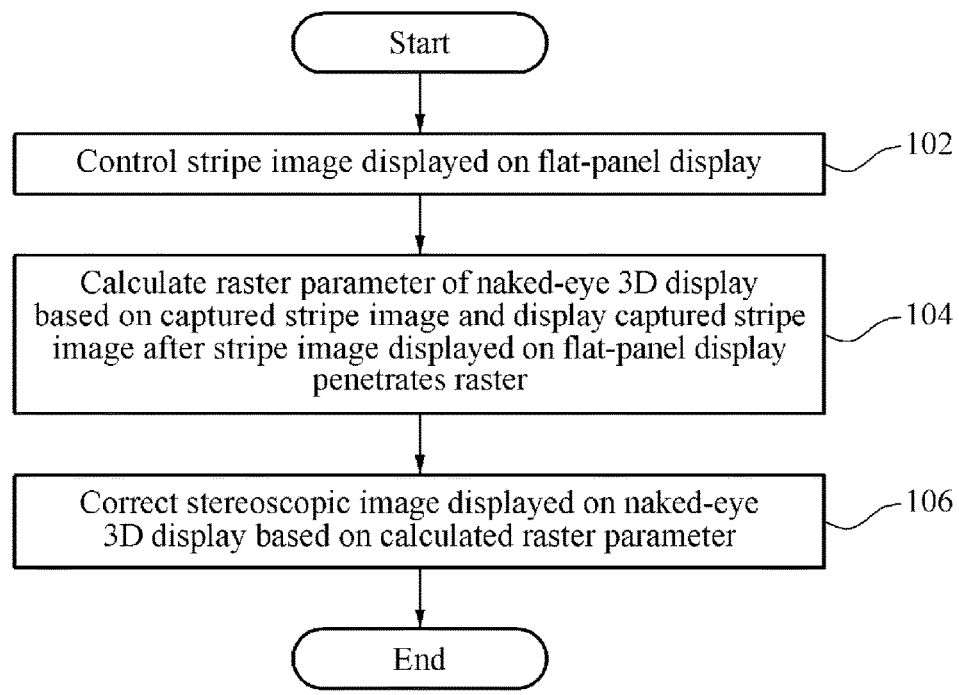
FIG. 3 illustrates an example of a method of correcting an image error in a naked-eye 3D display according to at least one example embodiment.

Referring to FIG. 3, a method of correcting an image error of a naked-eye 3D display includes the following operations.

In operation 102, a display controller may control a stripe image displayed on a flat-panel display. For example the display controller may control a display to display the stripe image such that, in the displayed stripe image, image rows may each be a periodic signal having the same wavelength and the periodic signal may have a change in brightness in a wavelength in each period. In operation 104, an image rectifier may calculate a raster parameter of the naked-eye 3D display based on a captured stripe image and the captured stripe image may be displayed after the stripe image displayed on the flat-panel display penetrates a raster. In operation 106, a stereoscopic image corrector may correct a stereoscopic image displayed on the naked-eye 3D display based on the calculated raster parameter. According to at least some example embodiments, the displayed stripe image may be an image that is displayed through a raster, and the image displayed through the raster may be captured as the captured image.

Figure 4:
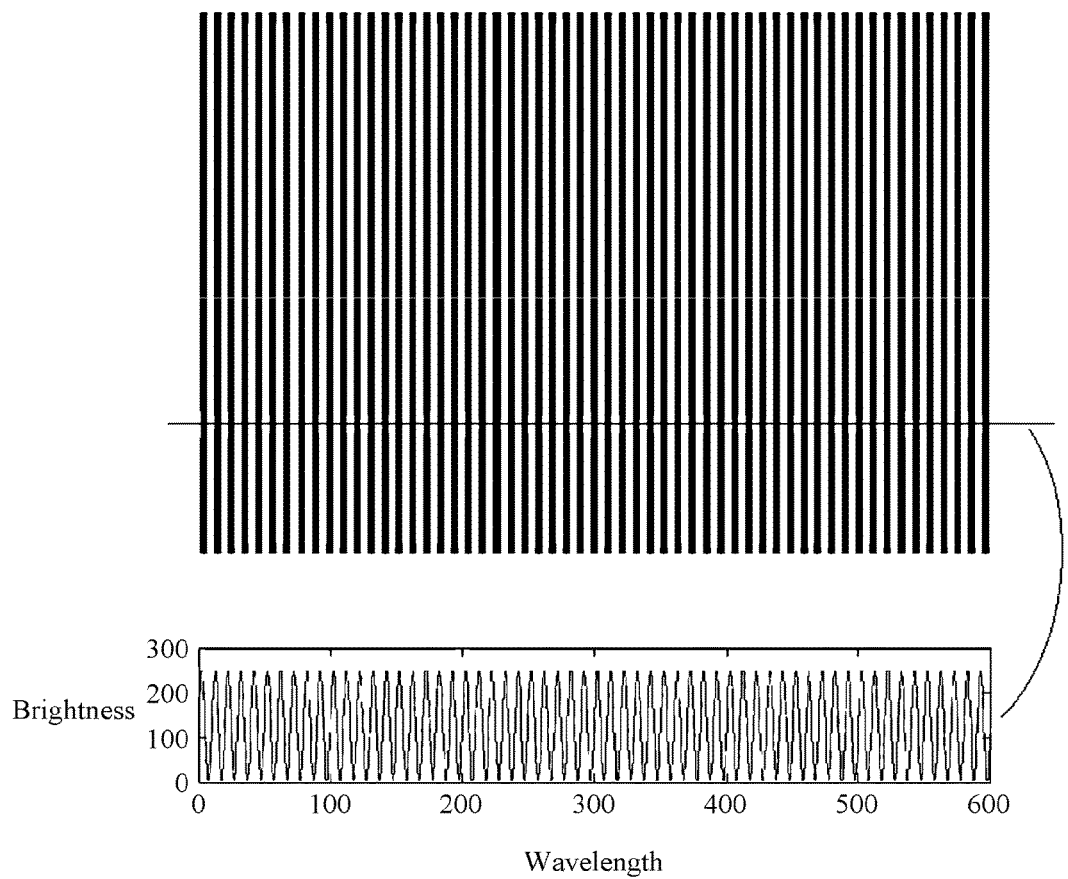
FIG. 4 illustrates an example of a stripe image displayed on a flat-panel display according to at least one example embodiment.

In FIG. 4, a brightness-periodicity changing stripe image displayed on the flat-panel image may also be referred to as a calibration stripe image. In the calibration stripe image, image rows may each be indicated by a periodic signal having the same periodicity and the periodic signal may have a change in brightness of a wavelength in each period. The periodic signal may be indicated by, for example, a period $T_c$, and a phase position H. For example, the periodic signal may be, but not limited to, a sine signal, a clock signal, or other type of periodical signal having a unit period.

After penetration of a raster of the naked-eye 3D display, a stripe image having different frequency and orientation may be generated based on the calibration stripe image. The generated stripe image may also be referred to as, for example, an observation stripe image. An ideally readily used observation stripe image may allow a user to use a general capturing device for capturing, capture a picture of at least one observation stripe image in a normal viewing distance, and acquire a raster parameter of the naked-eye 3D display in operation 104 as below. To allow the observation stripe image to achieve such characteristic, the calibration stripe image may be generated using the following method.

Figure 5:
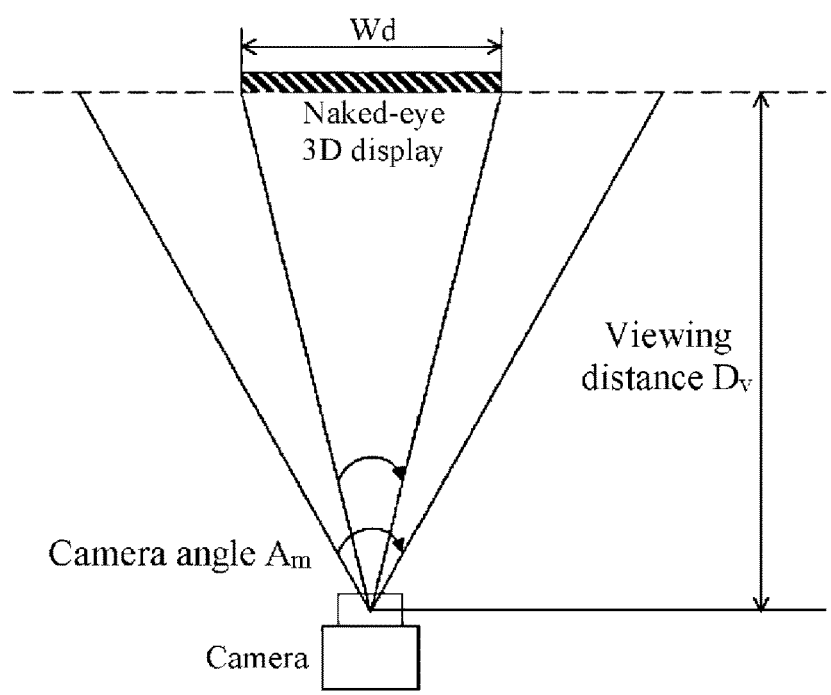
FIG. 5 illustrates an example of a relative position between a naked-eye 3D display and a capturing device according to at least one example embodiment.

Referring to FIG. 5, with respect to a naked-eye 3D display using one column-type raster, it is assumed that a raster gap (pitch of barrier) is $P_b$, an installation angle (slanted angle) is $A_s$, a gap between a raster and a flat-panel display or a prism lens array thickness is $G_b$, a designed viewing distance of the naked-eye 3D display is $D_v$ based on a design value. A sampling period of the raster on the flat-panel display in the designed viewing distance $D_v$ may be $T_b$ and, for example, $T_b = P_b*(D_v+G_b)/(\cos A_s*D_v)$.

The capturing device, for example a camera, used by the user may capture the observation stripe image displayed on the naked-eye 3D display. The camera may be, for example, a digital camera. The digital camera may be, for example, a camera having one or more complementary metal oxide semiconductor (CMOS) image sensors and/or one or more charge-coupled device (CCD) image sensors. In this example, when it is assumed that a horizontal angle of the capturing device is $A_m$, a vertical pixel resolution of the capturing device is $R_m$, a number of pixels of a stripe gap to be accurately extracted in during an image processing is $P_m$, and a width of the naked-eye 3D display is $W_d$, a period of a stripe image observed on a screen of the flat-panel display screen may need to be greater than $T_{min}$ to perform extraction, and $T_{min}$ may be calculated according to Equation 1.

$$T_{min}=2*D_v*\tan(A_m/2)*P_m/R_m \quad \text{[Equation 1]}$$

In practice, to compute a local change, a period $T_0$ of the stripe image observed on the screen of the flap-panel display may be set to be within an appropriate range, for example, $T_{min} < T_0 < M*T_{min}$. Here, M may be a predetermined or, alternatively, desired constant, for example, M=5.

As such, a period $T_c$ of the calibration stripe image may be controlled using Equation 2.

$$T_c=(T_0*T_b)/(T_0+T_b) \quad \text{[Equation 2]}$$

S1(x, y) corresponding to the calibration stripe image may be generated using Equation 3.

$$S1(x,y)=A1*0.5*[\sin(W_c*(x-P1))+1] \quad \text{[Equation 3]}$$

In Equation 3, x and y denote respectively a horizontal coordinate and a vertical coordinate of a pixel of the calibration stripe image on the screen of the flat-panel display. A1 denotes an amplitude of the calibration stripe image and, for example, A1 may be set to be "255" for an 8-bit brightness image. $W_c$ denotes a frequency of the calibration stripe image and, for example, $W_c=2\pi/T_c$. P1 denote a total error in the calibration stripe image and may be set to be zero.

As shown in Equation 3, S1(x) corresponding to a brightness value of a pixel at a position x of one image row may satisfy "$S1(x)=A1*0.5*[\sin(W_c*(x-P1))+1]$". "$S1(x)=0$" may be a brightness value obtained when a brightness of the pixel is the lowest. "$S1(x)=A1$" may be a brightness value obtained when the brightness of the pixel is the highest. When x changes in one period, a value applied to S1(x) may change in a range between 0 and A1. Concisely, although a wavelength of an image row has a brightness change in one period, the image row may be a periodic signal. Since the periodic signal has the same wavelength in each period, the image row may have the same brightness change of a wavelength in each period.

The image rectifier may calculate a raster parameter of the naked-eye 3D display based on a captured stripe image in operation 104. The captured stripe image may be displayed after the stripe image displayed on the flat-panel display, for example, the calibration stripe image penetrates the raster. For example, operation 104 may include two processes as below.

Process 1

An image including a captured stripe image may be rectified. For example, a capturing device may capture an image with respect to the observation stripe image displayed on the naked-eye 3D display. The captured image may be rectified and property information on an accurate raster may be extracted from the rectified image. In this example, coordinate systems of the screen of the flat-panel display and the rectified image may be aligned through a rectification.

Figure 6:
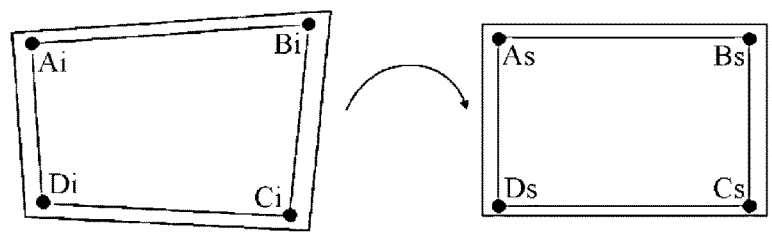
FIG. 6 illustrates an example of a rectified image in comparison to an unrectified image according to at least one example embodiment.

Referring to FIG. 6, an image of a capturing device may be inaccurately controlled. Thus, a difference in image conversion between the screen of the flat-panel display of a captured image and an actual screen may occur. The difference in image conversion may be determined based on, for example, a positional state of the capturing device and a lens parameter of the capturing device.

In response to the rectifying of the image captured by the capturing device through an image conversion, the rectified image and a coordinate system of the screen of the flat-panel display may be aligned. The unrectified image may be shown in a left portion of FIG. 6, and the rectified image may be shown in a right portion of FIG. 6. For example, $P_i=[x_i, y_i]$ may be coordinates of the pixel in the unrectified image and $P_s=[x_s,y_s]$ may be coordinates of the corresponding pixel in the rectified image.

In this example, a predetermined or, alternatively, desired pixel of the unrectified image and a corresponding pixel of the rectified image may satisfy Equation 4.

$$u*[x_s,y_s,1]^T=H*[x_i,y_i,1]^T \quad \text{[Equation 4]}$$

In Equation 4, u denotes a constant representing a standardization factor, H denotes a homographic matrix. The homographic matrix H may be acquired through an extraction of a feature point using a least square method.

For example, four corner points of the screen of the flat-panel display may be set to be feature points. As illustrated in FIG. 6, four corner points of the unrectified image may be $A_i$, $B_i$, $C_i$, and $D_i$, and four corner points of the rectified image may be $A_s$, $B_s$, $C_s$, and $D_s$. Coordinates of the four corner points in each of the unrectified image and the rectified image may be calculated based on a corner point extraction method. Coordinates of $A_i$ and $A_s$, coordinates of $B_i$ and $B_s$, coordinates of $C_i$ and $C_s$, and coordinates of $D_i$ and $D_s$ may be substituted to Equation 4 so as to acquire the homographic matrix H using the least square method.

After pixel coordinates of each pixel in the rectified image are acquired, the pixel coordinates may be converted into positional coordinates on the screen of the flat-panel display based on a length of a side of a tetragonal area corresponding to the pixel on the screen of the flat-panel display. For example, the length of the side of the tetragonal area may be 1 millimeter (mm), pixel coordinates of a pixel of a zeroth column and a zeroth row are [0, 0], and the pixel coordinates may be present outside an image in practice. In this example, when an origin of a coordinate system on the screen of the flat-panel display is set to be the pixel [0, 0], pixel coordinates $[x_s, y_s]$ of a pixel of the rectified image may be converted into positional coordinates $[l*x_s, l*y_s]$ on the screen of the flat-panel display.

Process 2

The raster parameter of the naked-eye 3D display may be calculated based on the stripe image in the rectified image. For example, a parameter associated with a gap between the raster and the screen of the flat-panel display, a parameter associated with a parallel translation of the raster relative to the screen of the flat-panel display, and a parameter associated with a rotation of the raster relative to the screen of the flat-panel display may be calculated.

A method of calculating a raster parameter corresponding to a parameter associated with a gap between the raster and the screen of the flat-panel display is described with reference to the foregoing example. Hereinafter, two methods of calculating the parameter associated with a gap between the raster and the screen of the flat-panel display will be described.

Method 1

A stripe image in a rectified image may be extracted and a sampling may be performed in the extracted stripe image at preset or, alternatively, desired sampling intervals. Through this, a group of image rows may be acquired. In this example, a region other than that of the screen of the flat-panel display may also be captured in practice. The image rows may be acquired through a sampling based on an equal-spacing scheme.

A low-frequency pass filter may be used to filter the image rows acquired through the sampling and remove noise from the image rows. The following operations may be performed on an image row acquired through the sampling.

A local period function acquirer may acquire peaks corresponding to the image row and calculate a number of pixels Num in a gap between neighboring peaks.

The local period function acquirer may calculate a distance between the neighboring peaks based on the number of pixels Num.

The local period function acquirer may acquire a local period function of a signal corresponding to the image row by performing fitting on the distance between the neighboring peaks.

Figure 7:
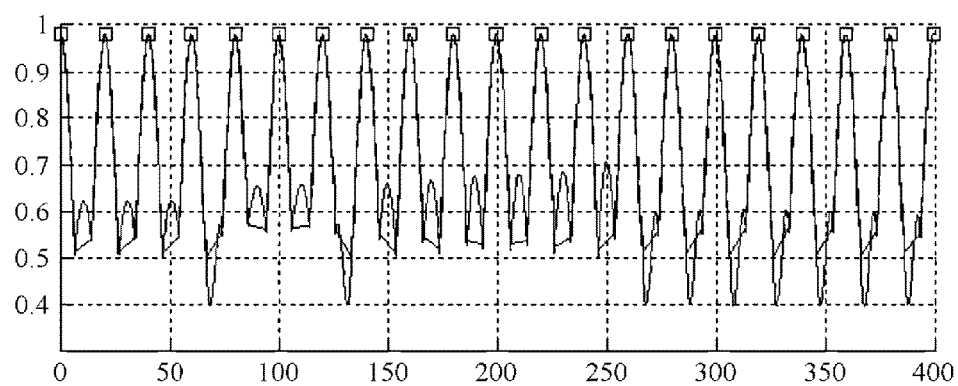
FIG. 7 illustrates an example of a signal peak extracted from an image row according to at least one example embodiment.

Referring to FIG. 7, a size of a neighboring pixel for each pixel on the image row may be calculated. Through this, a local maximum value of the image row may be extracted and the extracted local maximum value may be stored as a signal peak value. When the gap between the screen of the flat-panel display and the raster of the naked-eye 3D display is equal to an ideal value, the image row may be an ideal periodic signal, distances separating signal peaks may be equalized, and the distances may be the same as signal periods. When the raster includes an error, a difference between signal peaks may occur. In this example, a distance between neighboring peaks may correspond to a local period of a signal. An image distance between neighboring peaks, for example, the number of pixels Num in the gap between the neighboring peaks may be calculated and the image distance may be converted into a distance. Through this, the local period function corresponding to the image row may be calculated and acquired.

The distance between the neighboring peaks may be calculated according to Equation 5.

$$\text{PeakDist}=\text{Num}*Ws/\text{PixNum} \qquad \text{[Equation 5]}$$

In Equation 5, Ws denotes a width of a raster area corresponding to the extracted stripe image and PixNum denotes a number of pixels of an image row.

Figure 8:
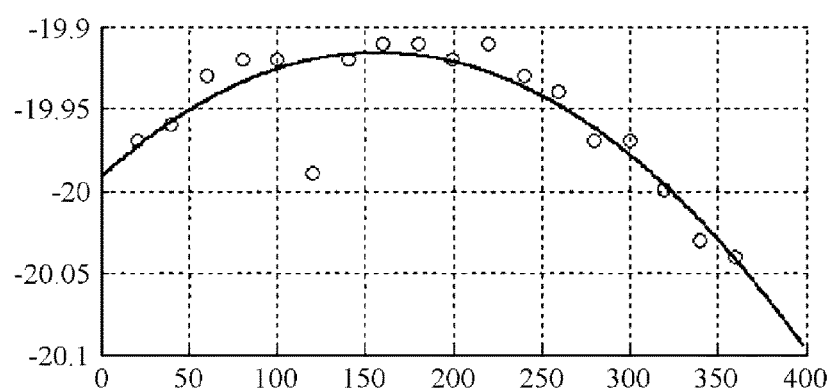
FIG. 8 illustrates an example of a local period function of an image row acquired by performing fitting using a local signal period value according to at least one example embodiment.

Referring to FIG. 8, a local period function $T_r(x; y_r)$ of a signal corresponding to the image row may be acquired through a fitting of a local period value, for example, the distance between the neighboring peaks. x represents a horizontal coordinate on the screen of the flat-panel display, $y_r$ represents a vertical coordinate of an $r^{th}$ image row on the screen of the flat-panel display, r is a value of 1 through N, and N denotes a total number of image rows acquired through the sampling.

A gap $G_r(x; y_r)$ between the screen of the flat-panel display and a raster corresponding to the image row may be calculated according to Equation 6.

$$G_r(x;y_r)=D_{cam}*(1-P_x/Tsr(x;y_r))) \qquad \text{[Equation 6]}$$

In Equation 6, $D_{cam}$ denotes a distance between the capturing device used for capturing and the screen of the flat-panel display and $P_x$ denotes a horizontal raster gap. When it is assumed that a prism raster is positioned at an angle $A_b$ and the angle $A_b$ is an included angle between a vertical line and an axis line of a prism, $P_x=P_b/\cos(A_b)$, $P_b$ may be a vertical distance between two prism axis lines neighboring the prism raster, Tsr(x; $y_r$) may be a period change function for which the capturing device performs sampling through a penetration of the raster relative to the screen of the flat-panel display, and Tsr(x; $y_r$)=$T_r(y_r)*T_r(x; y_r)/(T_r(x; y_r)-T_c(y_r))$, $T_c(y_r)$ being a period of the $r^{th}$ image row.

$D_{cam}$ may be acquired using one camera pose calculator. For example, using the camera pose calculator, the capturing device may calculate an attitude $R_c$ and a position $T_c$ with respect to a coordinate system on the screen of the flat-panel display and acquire $D_{cam}$.

Figure 9:
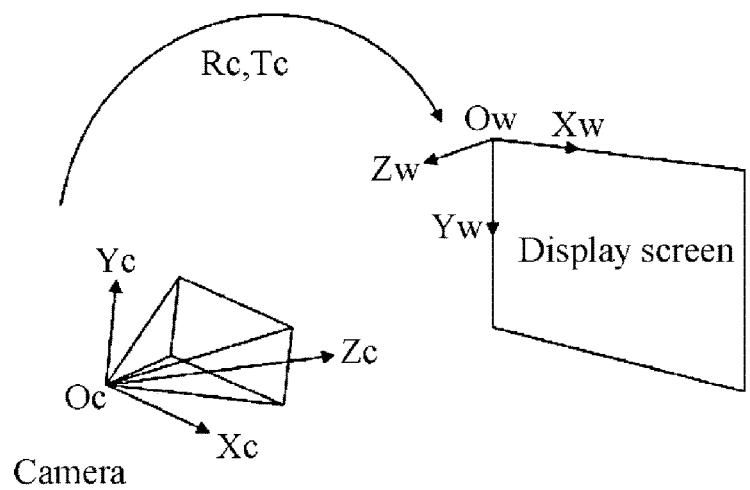
FIG. 9 illustrates an example of a positional relationship between a coordinate system of a capturing device and a coordinate system of a screen of a flat-panel display according to at least one example embodiment.

When it is assumed that the capturing device is able to represent the figure and the position on the screen of the flat-panel display in forms of a rotation matrix $R_c$ and a parallel translation vector $T_c$, a relationship between a known 3D space point $M_i=[X_i, Y_i, Z_i]$ and a corresponding image point $P_i=[x_i, y_i]$ may satisfy Equation 7 with reference to FIG. 9.

$$u*[x_i, y_i, 1]^T = K_c*[R_c T_c]*[X_i, Y_i, Z_i, 1]^T \quad \text{[Equation 7]}$$

In Equation 7, $K_c$ denotes a known parameter in the capturing device.

When the 3D space point $M_i=[X_i, Y_i, Z_i]$ is on the screen of the flat-panel display, and when $Z_i=0$, Equation 8 used for simplification may be acquired as shown below.

$$u*[x_i, y_i, 1]^T = K_c*[r_1 r_2 T_c]*[X_i, Y_i, 1]^T \quad \text{[Equation 8]}$$

$R_c=[r_1 r_2 r_3]$, $r_1$, $r_2$ may be a first column and a second column of the rotation matrix $R_c$, and $K_c$ may be a 3×3 matrix. Thus, $[r_1 r_2 T_c] = u*K_c^{-1}*H$.

$r_3$ and $T_c$ may be acquired based on a unit orthogonality of the rotation matrix the capturing device may further acquire the position $T_c$ and the attitude $R_c$ of the coordinate system on the screen of the flat-panel display.

Also, in an actual operation, an image row neighboring the $r^{th}$ image row may be used in a process of calculating $G_r(x; y_r)$ to reduce an adverse effect of noise.

Figure 10:
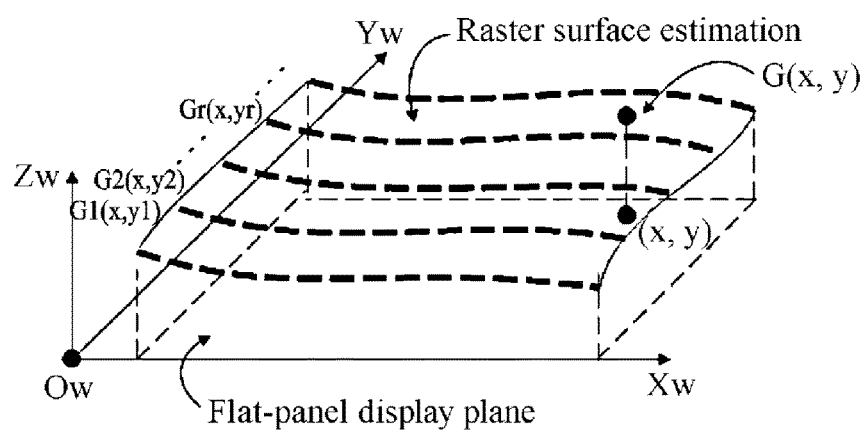
FIG. 10 illustrates an example of a gap between a screen of a flat-panel display and a raster in a naked-eye 3D display, the gap which is acquired through a fitting based on a three-element set $\{[x_c, y_r, G_r(x_c; y_r)]\}$ according to at least one example embodiment.

When operations S202 through S208 are performed all of the image rows acquired through the sampling, $G_1(x; y_1)$, $G_2(x; y_2)$, ..., $G_r(x; y_r)$, $G_N(x; y_N)$ corresponding to gap values between the flat-panel display and a group of rasters may be acquired with reference to FIG. 10. Through this, one three-element set $\{[x_c, y_r, G_r(x_c; y_r)]\}$ may be acquired. In the three-element set, all predetermined or, alternatively, desired elements $[x_c, y_r, G_r(x_c; y_r)]$ may be one three-element. In $[x_c, y_r, G_r(x_c; y_r)]$, $[x_c, y_r]$ denotes coordinates of one pixel on the screen of the flat-panel display, and $G_r(x_c; y_r)$ denotes a gap value of a gap between the screen of the flat-panel display and a raster corresponding to the pixel. Also, all coordinates corresponding to $[x_c, y_r]$ may be distributed on the screen of the flat-panel display.

Through a fitting performed using the three-element set $\{[x_c, y_r, G_r(x_c; y_r)]\}$, a gap function $G(x, y)$ between the screen of the flat-panel display and the raster may be acquired. In $G(x, y)$, $(x, y)$ represent coordinates of a position of a predetermined or, alternatively, desired point on the screen of the flat-panel display.

Method 2

In method 2, the screen of the flat-panel display may be divided into a plurality of local regions. In this example, under an assumption that a gap value between the screen of the flat-panel display and a raster corresponding to each of the local regions is a constant, the gap value may be calculated for each of the local regions. Based on the gap value, a gap between the screen of the flat-panel display and a raster corresponding to the entire screen of the flat-panel display may be calculated.

Based on different schemes of dividing the entire screen of the flat-panel display into a plurality of local regions, the gap between the screen of the flat-panel display and the raster corresponding to the entire screen of the flat-panel display may be calculated using the following schemes.

Scheme 1

Figure 11:
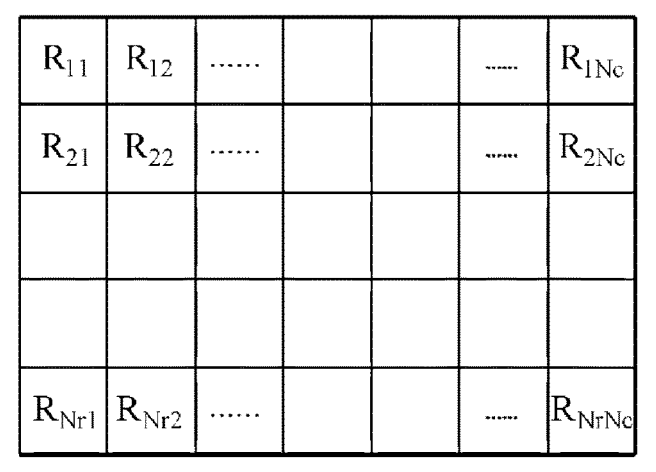

Referring to FIG. 11, the screen of the flat-panel display may be divided into a plurality of neighboring gratings having the same size. In $R_{ij}$, i may be a value of 1 through $N_r$, and j may be a value of 1 through $N_c$. A gap between the screen of the flat-panel display and the raster corresponding to each of the gratings may be a value of a constant.

An $N^{th}$ image row may be acquired by performing sampling in a stripe image of a grating $R_{ij}$ at preset or, alternatively, desired sampling intervals for each of the gratings $\{R_{ij}\}$. Operations S202 through S208 may be performed on each image row acquired through the sampling to acquire a gap $G_r(x; y_r)$ between the screen of the flat-panel display and a raster corresponding to each image row. When operations S202 through S208 are performed on the $N^{th}$ image row acquired through the sampling, gap values: $G_1(x; y_1)$, $G_2(x; y_2)$, ..., $G_r(x; y_r)$, ..., $G_N(x; y_N)$ between the flat-panel display and a group of rasters may be acquired. Also, $G(x)=\Sigma_{r=1}^N G_r(x; y_r)/N$ may be calculated and an x-directional average value may be calculated using $G(x)$. Through this, a gap $G_{ij}$ between the screen of the flat-panel display and the raster corresponding to the grating $R_{ij}$ may be acquired.

The gap $G(x, y)$ between the screen of the flat-panel display and the raster corresponding to, the entire screen of the flat-panel display may satisfy Equation 9.

$$\text{If } [x, y] \in R_{ij}, G(x, y) = G_{ij} \quad \text{[Equation 9]}$$

In $G(x, y)$, $(x, y)$ may be coordinates of a position of a predetermined or, alternatively, desired point on the screen of the flat-panel display.

Scheme 2

Figure 12:
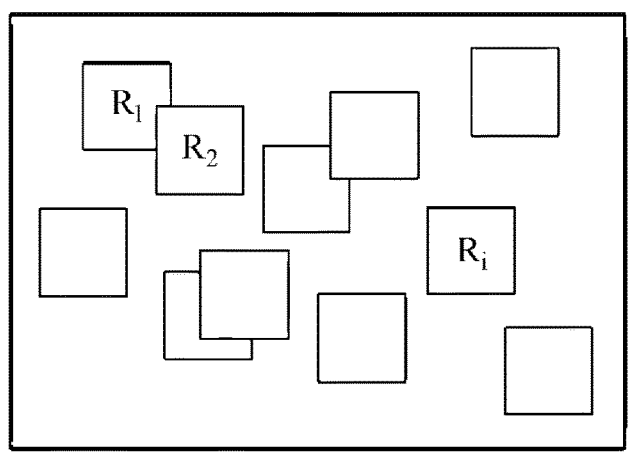
FIG. 12 illustrates another example of dividing a screen of a flat-panel display into gratings according to at least one example embodiment.

Referring to FIG. 12, generating a grating corresponding to a grating center point gradually through an iteration such that all regions on the screen of the flat-panel display covers the grating at least once, wherein the center point is generated based on a predetermined or, alternatively, desired random distribution and a size of the grating is determined in advance A center point $[x_i, y_i]$ of a plurality of gratings $\{R_i\}$ may be generated based on a predetermined or, alternatively, desired random distribution, for example, an equalized distribution and generate a grating corresponding thereto. Here, i may be a value of 1 through $N_i$. In this example, the center point may be continually generated based on the random distribution through iterations such that all regions on the screen of the flat-panel display cover the grating at least once. A gap between the screen of the flat-panel display and the raster corresponding to each grating may be a value of a constant.

For each of the gratings $\{R_i\}$, an $N^{th}$ image row may be acquired by performing sampling in a stripe image of the grating $R_i$ at preset or, alternatively, desired sampling intervals. Operations S202 through S208 may be performed on each image row acquired through the sampling to acquire a gap $G_r(x; y_r)$ between the screen of the flat-panel display and a raster corresponding to each image row. When operations S202 through S208 are performed on the $N^{th}$ image row acquired through the sampling, gap values: $G_1(x; y_1)$, $G_2(x; y_2)$, ..., $G_r(x; y_r)$, ..., $G_N(x; y_N)$ between the flat-panel display and a group of rasters may be acquired. Also, $G(x)=\Sigma_{r=1}^N G_r(x; y_r)/N$ may be calculated and an x-directional average value may be calculated based on $G(x)$. Through this, a gap $G_i$ between the screen of the flat-panel display and the raster corresponding to the grating $R_i$ may be acquired.

The gap $G(x, y)$ between the screen of the flat-panel display and the raster corresponding to, the entire screen of the flat-panel display may satisfy Equation 10.

$$G(x, y) = (1/N_a) * \sum_{i=1}^{N_s} [a(x, y, i) * G_i] \quad \text{[Equation 10]}$$

If $[x, y] \in R_i$, $a(x,y,i)=1$. If not $[x, y] \in R_i$, $a(x,y,i)=0$ and $N_a = \Sigma_{i=1}^{N_s} a(x,y,i)$. In $G(x, y)$, $(x, y)$ may be coordinates of a position of a predetermined or, alternatively, desired point on the screen of the flat-panel display.

Scheme 3

Figure 13:
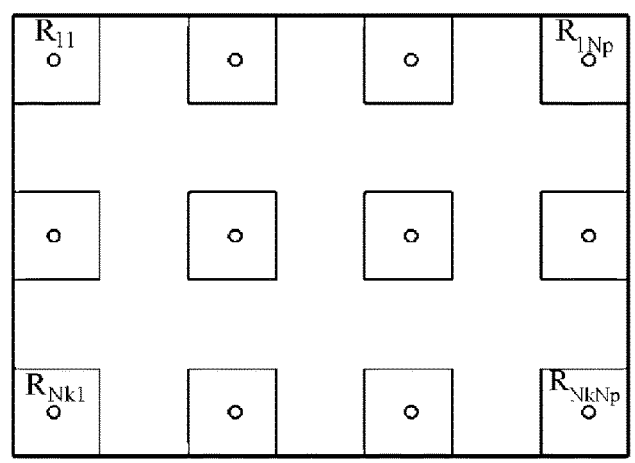
FIG. 13 illustrates still another example of dividing a screen of a flat-panel display into gratings according to at least one example embodiment.
Figure 14:
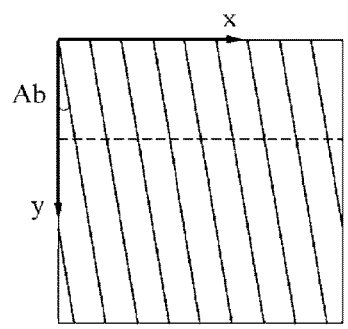
FIG. 14 illustrates an example of a screen direction vertical to a raster axis in a process of dividing a screen of a flat-panel display into gratings according to at least one example embodiment.

A group of sampling points may be acquired through a sampling performed on the screen of the flat-panel display, and a grating may be generated based on each of the sampling points as a center point. Through this, a plurality of gratings $\{R_{pk}\}$ may be acquired. Here, p is a value of 1 through $N_p$ and k is a value of 1 through $N_k$. As illustrated in FIG. 13, a gap between center points of neighboring gratings may be equalized. The neighboring gratings may separate from each other and also overlap each other. A gap between the screen of the flat-panel display and the raster corresponding to each of the gratings may be a value of a constant.

For each of the gratings $\{R_{pk}\}$, an $N^{th}$ image row may be acquired by performing sampling in a stripe image of the grating $R_{pk}$ at preset or, alternatively, desired sampling intervals. Operations S202 through S208 may be performed on each image row acquired through the sampling to acquire a gap $G_r(x; y_r)$ between the screen of the flat-panel display and a raster corresponding to each image row. When operations S202 through S208 are performed on the $N^{th}$ image row acquired through the sampling, gap values: $G_1(x; y_1)$, $G_2(x; y_2)$, ..., $G_r(x; y_r)$, ..., $G_N(x; y_N)$ between the flat-panel display and a group of rasters may be acquired. Also, $G(x)=\Sigma_{r=1}^{N}G_r(x; y_r)/N$ may be calculated and an x-directional average value may be calculated based on $G(x)$. Through this, a gap $G_{pk}$ between the screen of the flat-panel display and the raster corresponding to the grating $R_{pk}$ may be acquired.

By performing interpolation on the three-element set $\{[x_{pk}, y_{pk}, G_{pk}]\}$, the gap $G(x, y)$ between the flat-panel display and the raster corresponding to the entire screen of the flat-panel display may be acquired. Here, $G(x, y)$ may be one consecutive two-dimensional (2D) function, and $(x, y)$ denotes positional coordinates of a predetermined or, alternatively, desired point on the screen of the flat-panel display. In a predetermined or, alternatively, desired element $[x_{pk}, y_{pk}, G_{pk}]$ of the three-element set $\{[x_{pk}, y_{pk}, G_{pk}]\}$, $[x_{pk}, y_{pk}]$ denotes positional coordinates of a center point of the grating $R_{pk}$ on the screen of the flat-panel display, and $G_{pk}$ denotes a gap between the screen of the flat-panel display and a raster corresponding to the grating $R_{pk}$ a value obtained using the function of $G(x, y)$ acquired through the interpolation on a predetermined or, alternatively, desired interpolation point, for example, a sampling point may be the same as a value of the gap between the screen of the flat-panel display and a raster corresponding to the interpolation point in the three-element set $\{[x_{pk}, y_{pk}, G_{pk}]\}$. For example, if $x=X_{pk}$, and if $y=y_{pk}$, $G(x, y)=G_{pk}$.

In the aforementioned three schemes, $A_b$ in Equation 6, $P_x=P_b/\cos(A_b)$, may be calculated as further described below.

When a raster rotation angle is unknown, the raster rotation angle may be estimated. When it is assumed that an angle between a raster axis and a vertical direction of the screen is $A_b$, $A_b$ may be obtained using Equation 11 as below.

$$A_b = a\tan\left[((P_1(y)/T_r(y))+(P_r(y)/T_{sr}(y))-(P_r(y)/T_c(y)))/(((1/T_c(y))-(1/T_r(y)))*y)\right] \quad \text{[Equation 11]}$$

In Equation 11, $P_l(y)$ denotes a phase position of a periodic signal corresponding to an image row having a vertical coordinate y in the calibration stripe image, $T_c(y)$ denotes a period of a period function corresponding to the image row having the vertical coordinate y in the calibration stripe image, $T_r(y)$ denotes a period of a signal corresponding to the image row having the vertical coordinate y in an observation stripe image, $P_r(y)$ denotes a phase position of the signal corresponding to the image row having the vertical coordinate y in the observation stripe image, and $T_{sr}(y)$ denotes a period in which the capturing device penetrates the raster and sampling is performed on the screen of the flat-panel display, $Tsr(y)=(T_r(y)-T_c(y))/T_r(y)*T_c(y))$. In this example, a calculation accuracy of $A_b$ may increase using an average value acquired through a calculation performed on a plurality of columns under an assumption about a change in y.

In operation 106, the stereoscopic image corrector may correct the stereoscopic image displayed on the naked-eye 3D display based on the raster parameter calculated in operation 104.

For example, when the raster parameter calculated in operation 104 is a gap between the raster and the screen of the flat-panel display, in operation 106, a light beam model of the naked-eye 3D display may be acquired by computing a light beam corresponding to each pixel on the flat-panel display based on the gap $G(x, y)$ between the screen of the flat-panel display and the raster calculated in operation 104. What the light beam model indicates may be a 3D light beam corresponding to each pixel on the flat-panel display penetrating the raster toward a user observation space. The naked-eye 3D display may correct a stereoscopic image error due to a raster transformation through a rendering or a light field image conversion, thereby generating an enhanced stereoscopic image.

Based on another type of raster, such stereoscopic image may include a number of viewpoints differing for each image. For example, a binocular stereoscopic angle image may include left and right viewpoints. A prism lens or a slot raster-based stereoscopic image may include a few, for example, tens of viewpoints or less distributed in a horizontal direction. Also, a lens array raster-based stereoscopic image may include tens of hundreds of viewpoints distributed in a spatial region.

The foregoing method may be applicable to a naked-eye 3D display including a flat-panel display and a raster. For example, the method may be performed by controlling the flat-panel display to display a stripe image, capturing a stripe image displayed after the stripe image displayed on the flat-panel display penetrates the raster, calculating a raster parameter of the naked-eye 3D display based on the captured stripe image, adjusting a method of generating an image in the flat-panel display based on the calculated raster parameter, and correcting a stereoscopic image displayed on the naked-eye 3D display. Through this, a quality of the stereoscopic image displayed on the naked-eye 3D display may increase and a quality of a stereoscopic image viewed by a user may also increase.

Also, a predetermined or, alternatively, desired stripe image may be output by the flat-panel display. Each image row of the stripe image may be a periodic signal having an equal wavelength. The periodic signal may have a change in brightness in a wavelength of each period and each image row may have a periodic signal of a predetermined or, alternatively, desired frequency. Thus, a measurable image used to increase a local error through a mole stripe phenomenon may be generated. Also, since high definition image is to be captured using a general capturing device, for example, a camera in a normal viewing distance, a user may not need to capture in a short distance and a difficulty in capturing may also be alleviated.

When the raster parameter is equal to the gap between the raster and the screen of the flat-panel display, a gap function of the raster and the screen of the flat-panel display may be acquired using the method described in the foregoing example. A gap value corresponding to each pixel of the flat-panel display may be acquired. The aforementioned method may be applicable to a situation in which gaps between rasters corresponding to different pixels on the flat-panel display and the screen of the flat-panel display are different from one another, and a situation in which a dynamic change occurs in the gaps between the rasters and the flat-panel display. For example, a deformation occurring when a material of the raster is expanded due to a heat or compressed by a pressure may cause a change in the gap between the raster and the screen of the flat-panel display. Thus, the method of calculating a gap between the raster and the screen of the flat-panel display may be widely applicable and suitable for an actual situation.

Hereinafter, an apparatus for correcting an image error of the naked-eye 3D display by applying the aforementioned method will be described.

Figure 15:
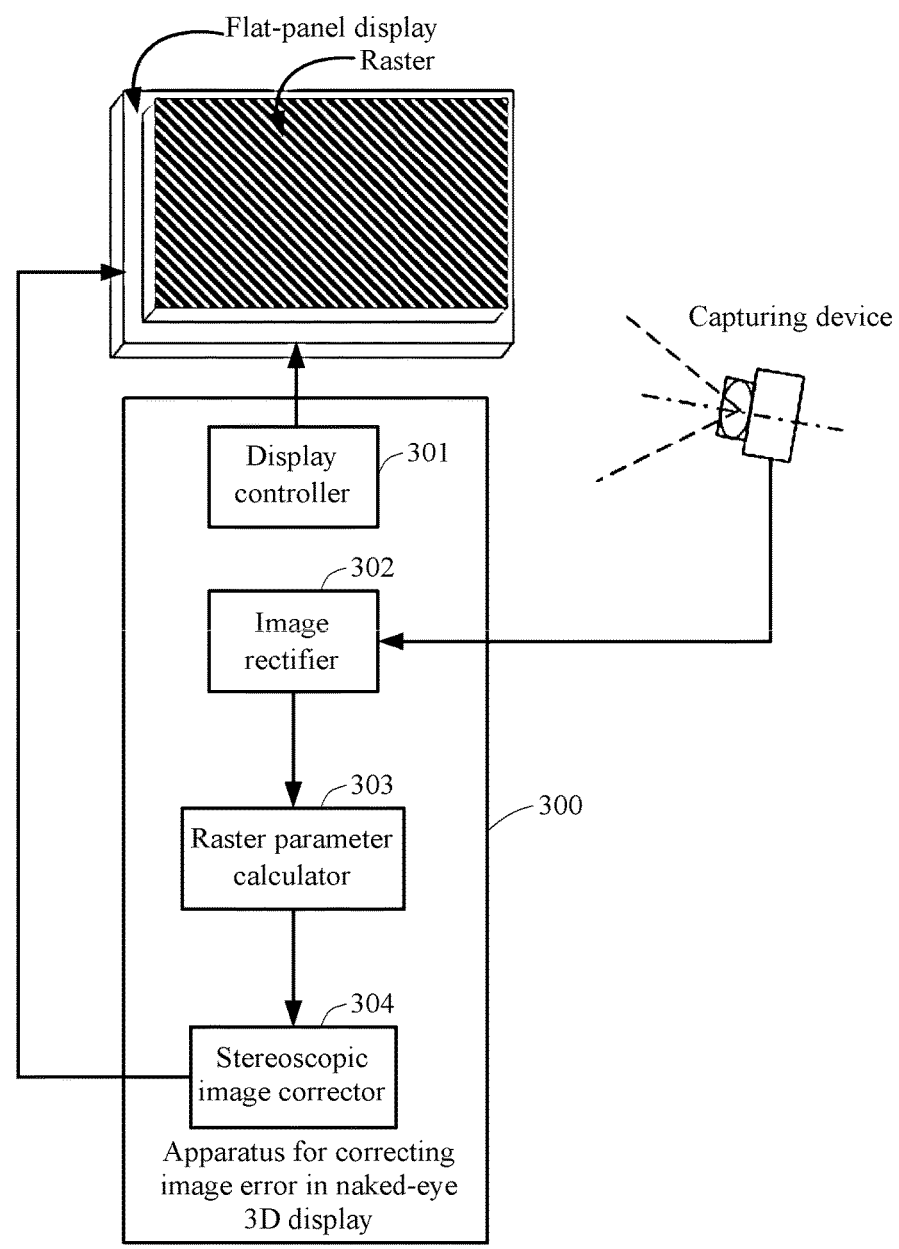
FIG. 15 illustrates an example of an apparatus of correcting an image error in a naked-eye 3D display according to at least one example embodiment.

Referring to FIG. 15, an apparatus 300 may be an apparatus for correcting an image error of a naked-eye 3D display. As is illustrated in FIG. 15, the apparatus 300 may include a display controller 301, an image rectifier 302, a raster parameter calculator 303, and a stereoscopic image corrector 304. The display controller 301 may control the flat-panel display to display a stripe image. The image rectifier 302 may rectify an image including a stripe image captured by the raster parameter calculator 303 based on the captured stripe image before calculating a raster parameter of a naked-eye 3D display. The raster parameter calculator 303 may calculate the raster parameter of the naked-eye 3D display based on the captured stripe image such that the captured stripe image corresponding to the stripe image displayed on the flat-panel display is displayed after penetrating the raster. The stereoscopic image corrector 304 may correct a stereoscopic image displayed on the naked-eye 3D display based on the raster parameter calculated by the raster parameter calculator 303.

According to at least one example embodiment, the apparatus 300 may include or be implemented by one or more circuits or circuitry (e.g., hardware) specifically structured to carry out and/or control some or all of the operations described in the present disclosure as being performed by the apparatus 300 (or an element thereof). According to at least one example embodiment, the apparatus 300 may include or be implemented by a memory and one or more processors executing computer-readable code (e.g., software and/or firmware) that is stored in the memory and includes instructions for causing the one or more processors to carry out and/or control some or all of the operations described herein as being performed by the apparatus 300 (or an element thereof). According to at least one example embodiment, the apparatus 300 may be implemented by, for example, a combination of the above-referenced hardware and one or more processors executing computer-readable code.

Further, according to at least some example embodiments, any or all of the display controller 301, image rectifier 302, raster parameter calculator 303, stereoscopic image corrector 304, and elements thereof may be implemented by one or both of the above-referenced (i) hardware and (ii) one or more processors executing computer-readable code.

According to at least some example embodiments, each of the one or more processors may be a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

According to at least some example embodiments,

Each image row of the stripe image displayed on the flat-panel display may have the same wavelength of a period function, and a wavelength of each period function may have a change in brightness.

$S1(x, y)$ corresponding to the stripe image displayed on the flat-panel display may satisfy the following equations: $S1(x,y)=A1*0.5*[sin(W_c*(x-P1))+1]$ where x denotes a horizontal coordinate of a pixel of the stripe image on a screen of the flat-panel display, y denotes a vertical coordinate of the pixel, A1 denotes an amplitude of the stripe image, and P1 denotes an error in the stripe image; $W_c=2\pi/T_c$, $T_c=(T_o*T_b)/(T_o+T_b)$ where $T_b$ denotes a sampling period of the raster on the screen of the flat-panel display; $T_{min}<T_o<M*T_{min}$ where M is a predetermined or, alternatively, desired constant; and $T_{min}=2*D_v*tan(A_m/2)*P_m/R_m$ where $D_v$ denotes a viewing distance of the naked-eye 3D display, $A_m$ denotes a horizontal angle of a capturing device used for capturing, $P_m$ denotes a number of pixels in a gap between stripes to be extracted during an image processing, and $R_m$ denotes a horizontal pixel resolution of the capturing device.

The rectified image and an unrectified image satisfy an equation $u*[x_s,y_s,1]^T=H*[x_i,y_1,1]$ where u denotes a standardization factor, $P_i=[x_i,y_i]$ is coordinates of a predetermined or, alternatively, desired pixel of the unrectified image, $P_s=[x_s,y_s]$ is coordinates of a pixel of the rectified image corresponding to the predetermined or, alternatively, desired pixel of the unrectified image, and H denotes a homographic transformation matrix.

Figure 16:
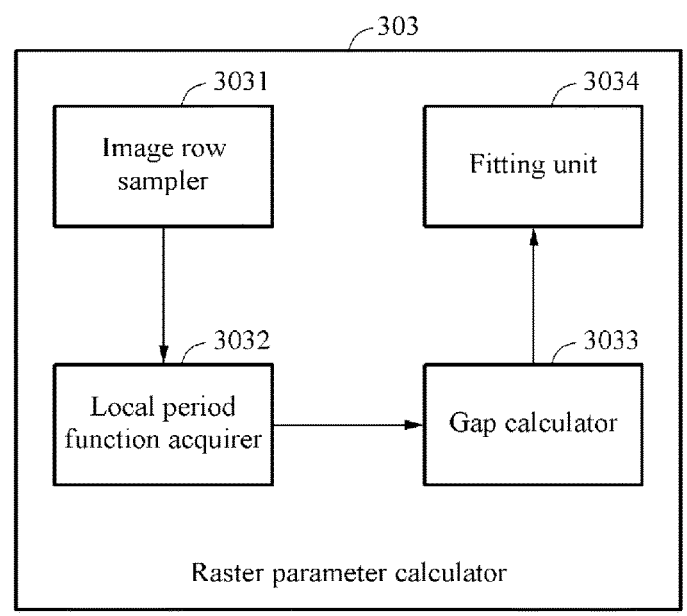
FIG. 16 illustrates an example of a raster parameter calculator included in an apparatus for correcting an image error of a naked-eye 3D display according to at least one example embodiment.

Referring to FIG. 16, the raster parameter calculator 303 may include an image row sampler 3031, a local period function acquirer 3032, a gap calculator 3033, and a fitting unit 3034. The image row sampler 3031 may acquire at least two image rows by performing sampling in a stripe image of an image rectified by the image rectifier 302 at preset or, alternatively, desired sampling intervals. The local period function acquirer 3032 may acquire a local period function $T_r(x; y_r)$ of a signal corresponding to an $r^{th}$ image row acquired by the image row sampler 3031 through the sampling. In $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling. The gap calculator 3033 may calculate $G_r(x; y_r)$ corresponding to a gap between the screen of the flat-panel display and a raster corresponding to the $r^{th}$ image row acquired by the image row sampler 3031 through the sampling, and $G_r(x; y_r)$ may satisfy the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device perform sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row. The fitting unit 3034 may acquire a gap G(x, y) between the raster and the flat-panel display by performing fitting based on a three-element set $\{[x_c, y_r, G_r(x; y_r)]\}$. In a predetermined or, alternatively, desired element $[x_c, y_r, G_r(x; y_r)]$ of the three-element set $\{[x_c, y_r, G_r(x; y_r)]\}$, $[x_c, y_r]$ denotes coordinates of a pixel on the screen of the flat-panel display and $G_r(x; y_r)$ denotes a gap between the screen of the flat-panel display and the raster corresponding to the pixel on which the gap calculator 3033 has performed calculation.

Figure 17:
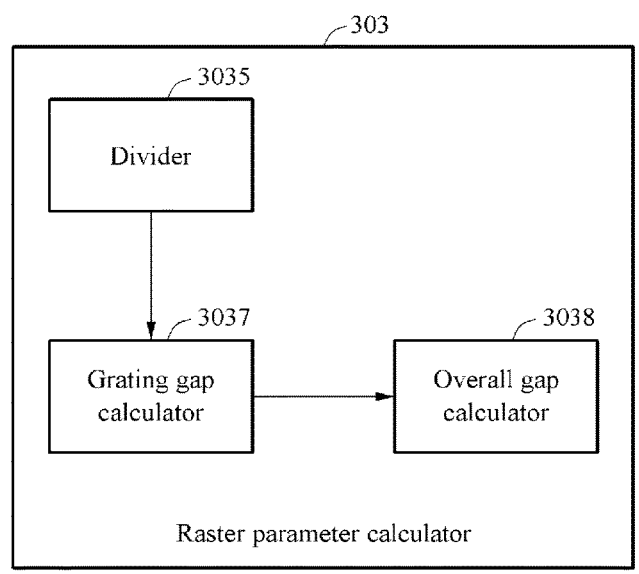
FIG. 17 illustrates another example of a raster parameter calculator included in an apparatus for correcting an image error of a naked-eye 3D display according to at least one example embodiment.

Referring to FIG. 17, the raster parameter calculator 303 may include a divider 3035, a grating gap calculator 3037, and an overall gap calculator 3038. The divider 3035 may divide the screen of the flat-panel display into at least two neighboring gratings $\{R_{ij}\}$ having the same size, i being a value of 1 through $N_r$, and j being a value of 1 through $N_c$. Here, $N_r$ denotes a number of rows of a grating acquired through a division, and $N_c$ denotes a number of columns of the grating. The grating gap calculator 3037 may calculate a gap $G_{ij}$ between the screen of the flat-panel display and a raster of the grating using a predetermined or, alternatively, desired method for each of the gratings $\{R_{ij}\}$ acquired through the division performed by the divider 3035, $G_{ij}$ being a constant. G(x, y) corresponding to the gap between the flat-panel display and the raster of the naked-eye 3D display calculated by the overall gap calculator 3038 may satisfy an equation "$G(x, y)=G_{ij}$, $[x, y] \in R_{ij}$". The predetermined or, alternatively, desired method may include an operation of acquiring at least two image rows by sampling a stripe image corresponding to the gratings and the rectified image at preset or, alternatively, desired sampling intervals, an operation of acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, an operation of calculating $G_r(x; y_r)$ corresponding to a distance between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval, and $Tsr(x; y_r)$ is a period change function for which the capturing device performs sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and an operation of calculating $G(x)=\Sigma_{r=1}^{N}(x; y_r)/N$ and acquiring $G_{ij}$ by calculating an x-directional average value using G(x).

Figure 18:
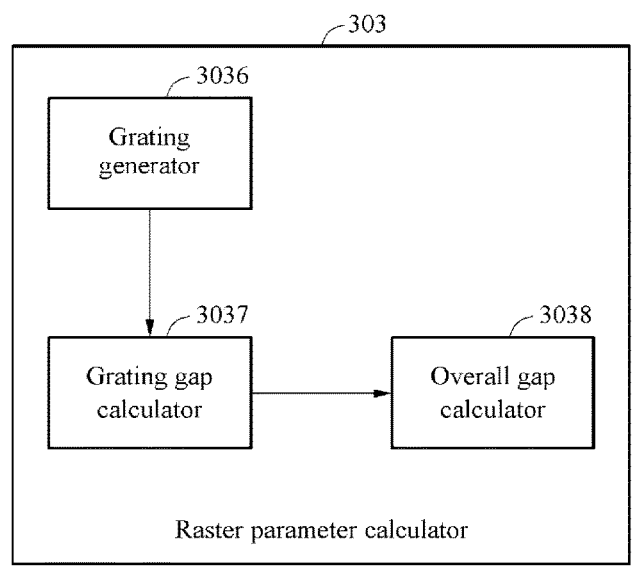
FIG. 18 illustrates still another example of a raster parameter calculator included in an apparatus for correcting an image error of a naked-eye 3D display according to at least one example embodiment.

Referring to FIG. 18, the raster parameter calculator 303 may include a grating generator 3036, the grating gap calculator 3037, and the overall gap calculator 3038.

The grating generator 3036 may generate a grating corresponding to a grating center point gradually and iteratively such that all regions on the screen of the flat-panel display cover the grating at least once. The center point may be generated based on a predetermined or, alternatively, desired random distribution and a size of the grating may be determined in advance. The grating gap calculator 3037 may calculate $G_i$ corresponding to a gap between the screen of the flat-panel display and a raster of the grating using a predetermined or, alternatively, desired method for each of the gratings $R_{ij}$ generated by the grating generator 3036. Here, $G_{ij}$ is a constant, i is a value of 1 through $N_s$, and $N_s$ denotes a total number of grating. G(x, y) corresponding to a gap between the flat-panel display and the raster of the naked-eye 3D display calculated by the overall gap calculator 3038 may satisfy an equation "$G(x, y)=(1/N_a)*\Sigma_{i=1}^{N_s}[a(x,y,i)*G_i]$. In this equation, if $[x, y] \in R_i$, $a(x,y,i)$ is 1, and if not $[x, y] \in R_i$, $a(x,y,i)$ is zero and $N_a=\Sigma_{i=1}^{N_s}a(x,y,i)$. Also, an operation of acquiring at least two image rows by performing sampling in a stripe image corresponding to the grating and the rectified image at preset or, alternatively, desired sampling intervals, an operation of acquiring a local period function $T_r(x; y_r)$ of a signal corresponding to an $r^{th}$ image row acquired through the sampling, wherein, in $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling, an operation of calculating $G_r(x; y_r)$ corresponding to a gap between the flat-panel display and a raster corresponding to the $r^{th}$ image row, $G_r(x; y_r)$ satisfying the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device perform sampling by penetrating the raster relative to the screen of the flat-panel display; and $Tsr(x; y_r)=T_c(y_r)*T_r(x; y_r)/(T_r(x; y_r)-T_c(y_r))$ where $T_c(y_r)$ denotes a period of the $r^{th}$ image row, and an operation of calculating $G(x)=\Sigma_{r=1}^{N}G_r(x; y_r)/N$ and acquiring $G_i$ by calculating an x-directional average value using G(x) may be performed.

In one example, the raster parameter calculator 303 may also include the grating generator 3036, the grating gap calculator 3037, and the overall gap calculator 3038. The grating generator 3036 may acquire at least two sampling points by performing sampling on the screen of the flat-panel display and generate a grating in a predetermined or, alternatively, desired size based on each of the sampling points as a center point. The grating gap calculator 3037 may calculate $G_{pk}$ corresponding to a gap between the screen of the flat-panel display and a raster of the grating using a predetermined or, alternatively, desired method with respect to each grating $R_{pk}$ generated by the grating generator 3036. Here, $G_{pk}$ is a constant, p is a value of 1 through $N_p$, k is a value of 1 through $N_k$, $N_p$ denotes a number of rows in the grating, and $N_k$ denotes a number of columns in the grating. The overall gap calculator 3038 may acquire G(x, y) corresponding to a gap between the flat-panel display and the raster of the naked-eye 3D display through an interpolation of a three-element set $\{[x_{pk}, y_{pk}, G_{pk}]\}$. In the three-element set $\{[x_{pk}, y_{pk}, G_{pk}]\}$, a predetermined or, alternatively, desired element $[x_{pk}, y_{pk}]$ represents coordinates of a center point of the grating $R_{pk}$ on the screen of the flat-panel display and $G_{pk}$ denotes a gap between a raster in the grating $R_{pk}$ and the screen of the flat-panel display. The overall gap calculator 3038 may acquire at least two image rows by performing sampling in a stripe image corresponding to the grating and the rectified image at preset or, alternatively, desired sampling intervals, and acquire a local period function $T_r(x; y_r)$ of a signal corresponding to an $r^{th}$ image row acquired through the sampling. In $T_r(x; y_r)$, x denotes a horizontal coordinate on the screen of the flat-panel display, $y_r$ denotes a vertical coordinate of the $r^{th}$ image row on the screen of the flat-panel display, r is a value of 1 through N, and N denotes a total number of image rows acquired through the sampling. $G_r(x; y_r)$ corresponding to a gap between the flat-panel display and a raster corresponding to the $r^{th}$ image row, $G_r(x; y_r)$ may satisfy the following equations: $G_r(x; y_r)=D_{cam}*(1-(P_x/Tsr(x; y_r)))$ where $D_{cam}$ denotes a distance between the screen of the flat-panel display and the capturing device, $P_x$ denotes a horizontal raster interval of the raster, and $Tsr(x; y_r)$ is a period change function for which the capturing device performs sampling by penetrating the raster relative to the screen of the flat-panel display; and $Tsr(x; y_r) = T_c(y_r)*T_r(x; y_r)/(T_r(x; y_r)-T_c(y_r))$ where $T_c(y_r)$ denotes a period of the $r^{th}$ image row. The overall gap calculator 3038 may also calculate "$G(x)=\Sigma_{r=1}^{N}G_r(x; y_r)/N$" and acquire $G_{pk}$ by calculating an x-directional average value using $G(x)$.

A scheme of acquiring a local period function of a signal corresponding to an image row may include a scheme of acquiring peaks of the signal corresponding to the image row and calculating a number of pixels Num included in a gap between neighboring peaks, a scheme of setting a calculated distance between neighboring peaks to be "Num*Ws/PixNum". In "Num*Ws/PixNum", Ws denotes a width of a raster area corresponding to a sampled stripe image, and PixNum denotes a number of pixels in the image row. Also, the scheme of acquiring a local period function of a signal corresponding to an image row may include a scheme of acquiring a local period function $T_r(x; y_r)$ of the signal corresponding to the image row by performing fitting on a distance between neighboring peaks.

Figure 19:
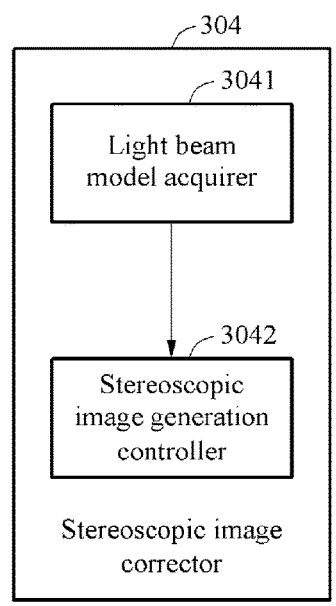
FIG. 19 illustrates an example of a stereoscopic image corrector included in an apparatus for correcting an image error in a naked-eye 3D display according to at least one example embodiment.

Referring to FIG. 19, the stereoscopic image corrector 304 may include a light beam model acquirer 3041 and a stereoscopic image generation controller 3042. The light beam model acquiring unit 3041 may acquire a light beam model of a naked-eye 3D display based on the calculated raster parameter calculated by the raster parameter calculator 303. The stereoscopic image generation control unit 3042 may control the naked-eye 3D display to generate a stereoscopic image using the light beam model acquired by the light beam model acquiring unit 3041.

As discussed in the foregoing examples, the following effects may be achieved.

The examples may be applicable to a naked-eye 3D display including a flat-panel display and a raster. For example, the method may be performed by controlling the flat-panel display to display a stripe image, capturing a stripe image displayed after the stripe image displayed on the flat-panel display penetrates the raster, calculating a raster parameter of the naked-eye 3D display based on the captured stripe image, adjusting a method of generating an image in the flat-panel display based on the calculated raster parameter, and correcting a stereoscopic image displayed on the naked-eye 3D display. Through this, a quality of the stereoscopic image displayed on the naked-eye 3D display may increase and a quality of a stereoscopic image viewed by a user may also increase.

Also, a predetermined or, alternatively, desired stripe image may be output by the flat-panel display. Each image row of the stripe image may be a periodic signal having an equal wavelength. The periodic signal may have a change in brightness in a wavelength of each period and each image row may have a periodic signal of a predetermined or, alternatively, desired frequency. Thus, a measurable image used to increase a local error through a mole stripe phenomenon may be generated. Also, since high definition image is to be captured using a general capturing device, for example, a camera in a normal viewing distance, a user may not need to capture in a short distance and a difficulty in capturing may also be alleviated.

When the raster parameter is equal to the gap between the raster and the screen of the flat-panel display, a gap function of the raster and the screen of the flat-panel display may be acquired using the method described in the foregoing example. A gap value corresponding to each pixel of the flat-panel display may be acquired. The aforementioned method may be applicable to a situation in which gaps between rasters corresponding to different pixels on the flat-panel display and the screen of the flat-panel display are different from one another, and a situation in which a dynamic change occurs in the gaps between the rasters and the flat-panel display. For example, a deformation occurring when a material of the raster is expanded due to a heat or compressed by a pressure may cause a change in the gap between the raster and the screen of the flat-panel display. Thus, the method of calculating a gap between the raster and the screen of the flat-panel display may be widely applicable and suitable for an actual situation.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of correcting an image error in a naked-eye three-dimensional (3D) display, the method comprising:
controlling a flat-panel display displaying a calibration stripe image such that, for each row from among a plurality of rows of the calibration stripe image, brightness values of pixels along a length of the row vary in accordance with a periodic waveform;
obtaining, as a captured stripe image, a captured observation stripe image, the observation stripe image being an image resulting from the calibration stripe image passing through a raster provided on a surface of the flat-panel display;
calculating a raster parameter of the naked-eye 3D display based on the captured stripe image; and
correcting a stereoscopic image displayed on the naked-eye 3D display based on the calculated raster parameter,
wherein the naked-eye 3D display includes the flat-panel display and the raster.

2. The method of claim 1, wherein the periodic waveform has a uniform wavelength.

3. The method of claim 1, wherein S1(x, y) corresponding to the calibration stripe image satisfies the following equations:

$$S1(x,y)=A1*0.5*[\sin(W_c*(x-P1))+1]$$

where x denotes a horizontal coordinate of a pixel of the calibration stripe image on a screen of the flat-panel display, y denotes a vertical coordinate of the pixel, A1 denotes an amplitude of the calibration stripe image, and P1 denotes an error in the calibration stripe image;

$$W_c=2\pi/T_c, T_c=(T_o*T_b)/(T_o+T_b)$$

where Tb denotes a sampling period of the raster on the screen of the flat-panel display;

$$T_{min}<T_o<M*T_{min}$$

where M is a constant; and $$T_{min}=2*D_v*\tan(A_m/2)*P_m/R_m$$

where Dv denotes a viewing distance of the naked-eye 3D display, Am denotes a horizontal angle of a capturing device used for capturing, Pm denotes a number of pixels in a gap between stripes to be extracted during an image processing, and Rm denotes a horizontal pixel resolution of the capturing device.

4. The method of claim 1, wherein the calculating of the raster parameter based on the captured stripe image further includes rectifying an image including the captured stripe image and calculating the raster parameter based on the captured stripe image.

5. The method of claim 4, wherein the rectified image and an unrectified image satisfy the following equation:

$$u*[x_s,y_s,1]^T=H*[x_i,y_i,1]^T$$

where u denotes a standardization factor, $P_i=[x_i, y_i]$ is coordinates of a pixel of the unrectified image, $P_s=[x_s, y_s]$ is coordinates of a pixel of the rectified image corresponding to the pixel of the unrectified image, and H denotes a homographic transformation matrix.

6. The method of claim 4,
wherein, when the raster parameter corresponds to a gap between the raster and a screen of the flat-panel display, the raster parameter is calculated based on a first stripe image, the first stripe image being a stripe image included in the rectified image,
wherein the calculating of the raster parameter includes:
acquiring at least two image rows by performing sampling in the first stripe image of the rectified image at first sampling intervals;
acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;
calculating a gap $G_r(x; y_r)$ between the screen of the flat-panel display and a raster corresponding to the rth image row such that $G_r(x; y_r)$ satisfies the following equations:

$$G_r(x;y_r)=D_{cam}*(1-(P_x/Tsr(x;y_r)))$$

where Dcam denotes a distance between the screen of the flat-panel display and a capturing device, Px denotes a horizontal raster interval, and $Tsr(x; y_r)$ is a period change function for which the capturing device performs sampling by penetrating the raster relative to the screen of the flat-panel display; and $$Tsr(x;y_r)=T_c(y_r)*T_r(x;y_r)/(T_r(x;y_r)-T_c(y_r))$$

where $T_c(y_r)$ denotes a period of the rth image row; and
acquiring a gap G(x, y) between the raster and the flat-panel display by performing fitting based on a three-element set $\{[x_c,y_r,G_r(x; y_r)]\}$, wherein $[x_c, y_r]$ denotes coordinates of a pixel on the screen of the flat-panel display and $G_r(x; y_r)$ denotes a gap between the screen of the flat-panel display and the raster corresponding to the pixel.

7. The method of claim 4, wherein, when the raster parameter corresponds to a gap between the raster and a screen of the flat-panel display, the calculating of the raster parameter based on the captured stripe image includes:
dividing the screen of the flat-panel display into at least two neighboring gratings [Rij} having a same size, wherein, in Rij, i is a number having a value of 1 through Nr and j is a number having a value of 1 through Nc, Nr denotes a number of rows of a grating acquired through a division, and Nc denotes a number of columns of the grating;

calculating a gap Gij between the screen of the flat-panel display and a raster of the grating using a first method with respect to a respective grating Rij, Gij being a constant; and calculating a gap G(x, y) between the flat-panel display and the raster of the naked-eye 3D display, wherein if $[x, y] \in Rij$, G(x, y) satisfies the following equation:

$$G(x,y)=Gij,$$

wherein the first method includes:
acquiring at least two image rows by sampling a stripe image corresponding to the gratings and the rectified image at first sampling intervals;

acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;

calculating a gap $G_r(x; y_r)$ between the flat-panel display and a raster corresponding to the rth image row, such that $G_r(x; y_r)$ satisfies the following equations:

$$G_r(x;y_r)=D_{cam}*(1-(P_x/Tsr(x;y_r)))$$

where Dcam denotes a distance between the screen of the flat-panel display and a capturing device, Px denotes a horizontal raster interval, and Tsr(x; $y_r$) is a period change function for which the capturing device performs sampling by penetrating the raster relative to the screen of the flat-panel display; and $$Tsr(x;y_r)=T_c(y_r)*T_r(x;y_r)/(T_r(x;y_r)-T_c(y_r))$$

where $T_c(y_r)$ denotes a period of the rth image row; and calculating $G(x)=\Sigma_{r=1}^{N}G_r(x; y_r)/N$ and acquiring Gij by calculating an x-directional average value using G(x).

8. The method of claim 4, wherein, when the raster parameter corresponds to a gap between the raster and a screen of the flat-panel display, the calculating of the raster parameter based on the captured stripe image includes:

generating a grating corresponding to a grating center point gradually and iteratively such that all regions on the screen of the flat-panel display cover the grating at least once, wherein the center point is generated based on a first random distribution and a size of the grating is determined in advance; and calculating Gi corresponding to a gap between the screen of the flat-panel display and a raster of the grating using a first method with respect to a respective grating Rij, wherein Gij is a constant, i is a number having a value of 1 through Ns, Ns denotes a total number of gratings, and a gap G(x, y) between the raster and the flat-panel display such that G(x, y) satisfies the following equation:

$$G(x,y)=(1/N_a)*\Sigma_{i=1}^{Ns}[a(x,y,i)*G_i]$$

where if $[x, y] \in Ri$, a(x,y,i) is 1, and if not $[x, y] \in Ri$, a(x,y,i) is zero and $N_a=\Sigma_{i=1}^{Ns}a(x,y,i)$, wherein the first method includes:
acquiring at least two image rows by performing sampling in a stripe image corresponding to the grating and the rectified image at first sampling intervals;

acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;

calculating a gap $G_r(x; y_r)$ between the flat-panel display and a raster corresponding to the rth image row, such that $G_r(x; y_r)$ satisfies the following equations:

$$G_r(x;y_r)=D_{cam}*(1-(P_x/Tsr(x;y_r)))$$

where Dcam denotes a distance between the screen of the flat-panel display and a capturing device, Px denotes a horizontal raster interval of the raster, and Tsr(x; $y_r$) is a period change function for which the capturing device performs sampling by penetrating the raster relative to the screen of the flat-panel display; and $$Tsr(x;y_r)=T_c(y_r)*T_r(x;y_r)/(T_r(x;y_r)-T_c(y_r))$$

where $T_c(y_r)$ denotes a period of the rth image row; and calculating $G(x)=\Sigma_{r=1}^{N}G_r(x; y_r)/N$ and acquiring Gij by calculating an x-directional average value using G(x).

9. The method of claim 4, wherein, when the raster parameter corresponds to a gap between the raster and a screen of the flat-panel display, the calculating of the raster parameter based on the captured stripe image includes:

acquiring at least two sampling points by performing sampling on the screen of the flat-panel display and generating a grating in a first size based on each of the sampling points as a center point;

calculating Gpk corresponding to a gap between the screen of the flat-panel display and a raster of the grating using a first method for each grating Rpk, wherein Gpk is a constant, p is a number having a value of 1 through Np, k is a number having a value of 1 through Nk, Np denotes a number of rows in the grating, and Nk denotes a number of columns in the grating; and acquiring G(x, y) corresponding to a gap between the raster and the flat-panel display through an interpolation of a three-element set $\{[x_{pk}, y_{pk}, G_{pk}]\}$, where $[x_{pk}, y_{pk}]$ denotes coordinates of a center point of the grating Rpk on the screen of the flat-panel display, and Gpk denotes a gap between a raster in the grating Rpk and the screen of the flat-panel display, wherein the first method includes:
acquiring at least two image rows by performing sampling in a stripe image corresponding to the grating and the rectified image at first sampling intervals;

acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;

calculating a gap $G_r(x; y_r)$ between the flat-panel display and a raster corresponding to the rth image row, $G_r(x; y_r)$ satisfying the following equations:

$$G_r(x;y_r)=D_{cam}*(1-(P_x/Tsr(x;y_r)))$$

where Dcam denotes a distance between the screen of the flat-panel display and a capturing device, Px denotes a horizontal raster interval of the raster, and Tsr(x; $y_r$) is a period change function for which the capturing device performs sampling by penetrating the raster relative to the screen of the flat-panel display; and $$Tsr(x;y_r)=T_c(y_r)*T_r(x;y_r)/(T_r(x;y_r)-T_c(y_r))$$

where $T_c(y_r)$ denotes a period of the rth image row; and calculating $G(x)=\Sigma_{r=1}^{N}G_r(x; y_r)/N$ and acquiring Gpk by calculating an x-directional average value using G(x).

10. The method of claim 6, wherein a method of acquiring the local period function of the signal corresponding to the rth image row includes:

calculating a number of pixels Num corresponding to a distance between neighboring peaks based on peaks, each acquired from the signal corresponding to the image row, wherein the distance between the neighboring peaks is Num*Ws/PixNum, Ws denotes a width of a raster area corresponding to a sampled stripe image, and PixNum denotes a number of pixels in the image row; and acquiring a local period function $T_r(x; y_r)$ of the signal corresponding to the image row by performing fitting on the distance between the neighboring peaks.

11. An apparatus for correcting an image error in a naked-eye three-dimensional (3D) display, the apparatus comprising:

a flat-panel display including a screen;
a raster;
memory storing computer-executable instructions; and
one or more processors configured to execute the computer-executable instructions such that the one or more processors are configured to,
control a flat-panel to display a calibration stripe image such that, for each row from among a plurality of rows of the calibration stripe image, brightness values of pixels along a length of the row vary in accordance with a periodic waveform,
obtaining, as a captured stripe image, a captured observation stripe image, the observation stripe image being an image resulting from the calibration stripe image passing through a raster provided on a surface of the flat-panel display;
calculate a raster parameter of the naked-eye 3D display based on the captured stripe image; and
correct a stereoscopic image displayed on the naked-eye 3D display based on the calculated raster parameter.

12. The apparatus of claim 11, wherein the one or more processors are configured to execute the computer-executable instructions such that the one or more processors are configured such that the periodic waveform has a uniform wavelength.

13. The apparatus of claim 11, wherein the one or more processors are configured to execute the computer-executable instructions such that the one or more processors are configured such that S1(x, y) corresponding to the calibration stripe image satisfies the following equations:

$$S1(x,y)=A1*0.5[\sin(W_c*(x-P1))+1]$$

where x denotes a horizontal coordinate of a pixel of the calibration stripe image on the screen of the flat-panel display, y denotes a vertical coordinate of the pixel, A1 denotes an amplitude of the calibration stripe image, and P1 denotes an error in the calibration stripe image;

$$W_c=2\pi/T_c, T_c=(T_o*T_b)/(T_o+T_b)$$

where Tb denotes a sampling period of the raster on the screen of the flat-panel screen;

$$T_{min}<T_o<M*T_{min}$$

where M is a first constant; and $$T_{min}=2*D_v*\tan(A_m/2)*P_m/R_m$$

where Dv denotes a viewing distance of the naked-eye 3D display, Am denotes a horizontal angle of a capturing device used for capturing, Pm denotes a number of pixels in a gap between stripes to be extracted during an image processing, and Rm denotes a horizontal pixel resolution of the capturing device.

14. The apparatus of claim 11, wherein the one or more processors are configured to execute the computer-executable instructions such that the one or more processors are configured to rectify an image including the captured stripe image and calculate the raster parameter based on the captured stripe image.

15. The apparatus of claim 14, wherein the one or more processors are configured to execute the computer-executable instructions such that the one or more processors are configured such that the rectified image and an unrectified image satisfy the following equation:

$$u*[x_s,y_s,l]^T=H*[x_i,y_i,l]^T$$

where u denotes a standardization factor, $P_i=[x_i, y_i]$ is coordinates of a first pixel of the unrectified image, $P_s=[x_s, y_s]$ is coordinates of a pixel of the rectified image corresponding to the first pixel of the unrectified image, and H denotes a homographic transformation matrix.

16. The apparatus of claim 14, wherein the one or more processors are configured to execute the computer-executable instructions such that the one or more processors are configured such that, when the raster parameter corresponds to a gap between the raster and the screen of the flat-panel display, the one or more processors:

acquire at least two image rows by performing sampling in first stripe image at first sampling intervals, the first stripe image being a stripe image included in the rectified image;

acquire a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;

calculate a gap $G_r(x; y_r)$ between the screen of the flat-panel display and a raster corresponding to the rth image row such that $G_r(x; y_r)$ satisfies the following equations:

$G_r(x;y_r)=D_{cam}*(1-(P_x/Tsr(x;y_r)))$ where Dcam denotes a distance between the screen of the flat-panel display and a capturing device, Px denotes a horizontal raster interval, and Tsr(x; $y_r$) is a period change function for which the capturing device perform sampling by penetrating the raster relative to the screen of the flat-panel display; and $Tsr(x;y_r)=T_c(y_r)*T_r(x;y_r)/(T_r(x;y_r)-T_c(y_r))$ where $T_c(y_r)$ denotes a period of the rth image row; and perform fitting based on a three-element set {[$x_c$, $y_r$, $G_r(x; y_r)$]} and acquire a gap G(x, y) between the raster and the flat-panel display, wherein, in {[$x_c$, $y_r$, $G_r(x; y_r)$]}, [$x_c$, $y_r$] denotes coordinates of a pixel on the screen of the flat-panel display and $G_r(x; y_r)$ denotes a gap between the screen of the flat-panel display and the raster corresponding to the pixel.

17. The apparatus of claim 14, wherein the one or more processors are configured to execute the computer-executable instructions such that the one or more processors are configured such that, when the raster parameter corresponds to a gap between the raster and the screen of the flat-panel display, the calculating of the raster parameter based on the captured stripe image includes:
dividing the screen of the flat-panel display into at least two neighboring gratings {Rij} having a same size, wherein, in Rij, i is a number having a value of 1 through Nr, j is a number having a value of 1 through Nc, Nr denotes a number of rows of a grating acquired through a division, and Nc denotes a number of columns of the grating;
calculating a gap Gij between the screen of the flat-panel display and a raster of the grating using a first method with respect to a respective grating Rij, Gij being a constant; and
calculating a gap G(x, y) between the flat-panel display and the raster of the naked-eye 3D display, G(x, y) being equal to Gij if [x, y]∈Rij,
wherein the first method includes:
acquiring at least two image rows by sampling a stripe image corresponding to the gratings and the rectified image at first sampling intervals;
acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;
calculating a gap $G_r(x; y_r)$ between the flat-panel display and a raster corresponding to the rth image row, such that $G_r(x; y_r)$ satisfies the following equations:

$G_r(x;y_r)=D_{cam}*(1-(P_x/Tsr(x;y_r)))$ where Dcam denotes a distance between the screen of the flat-panel display and a capturing device, Px denotes a horizontal raster interval, and Tsr(x; $y_r$) is a period change function for which the capturing device performs sampling by penetrating the raster relative to the screen of the flat-panel display; and $Tsr(x;y_r)=T_c(y_r)*T_r(x;y_r)/(T_r(x;y_r)-T_c(y_r))$ where $T_c(y_r)$ denotes a period of the rth image row; and
calculating $G(x)=\Sigma_{r=1}^{N}G_r(x; y_r)/N$ and acquiring Gij by calculating an x-directional average value using G(x).

18. The apparatus of claim 14, wherein the one or more processors are configured to execute the computer-executable instructions such that the one or more processors are configured such that, when the raster parameter corresponds to a gap between the raster and the screen of the flat-panel display, the one or more processors:
generate a grating corresponding to a grating center point gradually and iteratively such that all regions on the screen of the flat-panel display cover the grating at least once, wherein the center point is generated based on a first random distribution and a size of the grating is determined in advance;
calculate Gi corresponding to a gap between the screen of the flat-panel display and a raster of the grating using a first method with respect to a respective grating Ri, wherein Gi is a constant, i is a number having a value of 1 through Ns, and Ns denotes a total number of grating; and
calculate a gap G(x, y) between the raster and the flat-panel display such that G(x, y) satisfies the following equation:

$G(x,y)=(1/N_a)*\Sigma_{i=1}^{N_s}[a(x,y,i)*G_i]$ where if [x, y]∈Ri, a(x,y,i) is 1, and if not [x, y]∈ Ri, a(x,y,i) is zero and $N_a=\Sigma_{i=1}^{N_s}a(x,y,i)$,
wherein the first method includes:
acquiring at least two image rows by performing sampling in a stripe image corresponding to the grating and the rectified image at first sampling intervals;
acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;
calculating a gap $G_r(x; y_r)$ between the flat-panel display and a raster corresponding to the rth image row, such that $G_r(x; y_r)$ satisfies the following equations:

$G_r(x;y_r)=D_{cam}*(1-(P_x/Tsr(x;y_r)))$ where Dcam denotes a distance between the screen of the flat-panel display and a capturing device, Px denotes a horizontal raster interval of the raster, and Tsr(x; $y_r$) is a period change function for which the capturing device perform sampling by penetrating the raster relative to the screen of the flat-panel display; and $Tsr(x;y_r)=T_c(y_r)*T_r(x;y_r)/(T_r(x;y_r)-T_c(y_r))$ where $T_c(y_r)$ denotes a period of the rth image row; and
calculating $G(x)=\Sigma_{r=1}^{N}G_r(x; y_r)/N$ and acquiring Gi by calculating an x-directional average value using G(x).

19. The apparatus of claim 14, wherein the one or more processors are configured to execute the computer-executable instructions such that the one or more processors are configured such that, when the raster parameter corresponds to a gap between the raster and the screen of the flat-panel display, the one or more processors:

acquire at least two sampling points by performing sampling on the screen of the flat-panel display and generate a grating in a first size based on each of the sampling points as a center point;

calculate Gpk corresponding to a gap between the screen of the flat-panel display and a raster of the grating using a first method with respect to each grating Rpk, wherein Gpk is a constant, p is a number having a value of 1 through Np, k is a number having a value of 1 through Nk, Np denotes a number of rows in the grating, and Nk denotes a number of columns in the grating; and acquire G(x, y) corresponding to a gap between the raster and the flat-panel display through an interpolation of a three-element set $\{[x_{pk}, y_{pk}, G_{pk}]\}$, where $[x_{pk}, y_{pk}]$ denotes coordinates of a center point of the grating Rpk on the screen of the flat-panel display, and Gpk denotes a gap between a raster in the grating Rpk and the screen of the flat-panel display, wherein the first method includes:

acquiring at least two image rows by performing sampling in a stripe image corresponding to the grating and the rectified image at first sampling intervals;

acquiring a local period function $T_r(x; y_r)$ of a signal corresponding to an rth image row acquired through the sampling, wherein, in $T_r(x; y_r)$, x denotes a horizontal coordinate on the screen of the flat-panel display, yr denotes a vertical coordinate of the rth image row on the screen of the flat-panel display, r is a number having a value of 1 through N, and N denotes a total number of image rows acquired through the sampling;

calculating a gap $G_r(x; y_r)$ c between the flat-panel display and a raster corresponding to the rth image row, such that $G_r(x; y_r)$ satisfies the following equations:

$G_r(x;y_r) = D_{cam} * (1-(P_x/Tsr(x;y_r)))$ where Dcam denotes a distance between the screen of the flat-panel display and a capturing device, Px denotes a horizontal raster interval of the raster, and Tsr(x; $y_r$) is a period change function for which the capturing device performs sampling by penetrating the raster relative to the screen of the flat-panel display; and $Tsr(x;y_r) = T_c(y_r) * T_r(x;y_r)/(T_r(x;y_r) - T_c(y_r))$ where $T_c(y_r)$ denotes a period of the rth image row; and calculating $G(x) = \Sigma_{r=n}^{N} G_r(x; y_r)/N$ and acquiring Gpk by calculating an x-directional average value using G(x).

20. The apparatus of claim 16, wherein the one or more processors are configured to execute the computer-executable instructions such that the one or more processors are configured to, calculate a number of pixels Num corresponding to a distance between neighboring peaks based on peaks, each acquired from the signal corresponding to the image row, wherein the distance between the neighboring peaks is Num*Ws/PixNum, Ws denotes a width of a raster area corresponding to a sampled stripe image, and PixNum denotes a number of pixels in the image row, and acquire a local period function $T_r(x; y_r)$ of the signal corresponding to the image row by performing fitting on the distance between the neighboring peaks.

* * * * *